United States Patent
Muthiah

(10) Patent No.: US 12,056,045 B2
(45) Date of Patent: Aug. 6, 2024

(54) SCRATCHPAD CACHE FOR GAMING AND IoT HOSTS

(71) Applicant: Western Digital Technologies, Inc., San Jose, CA (US)

(72) Inventor: Ramanathan Muthiah, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/841,378

(22) Filed: Jun. 15, 2022

(65) Prior Publication Data

US 2023/0409470 A1     Dec. 21, 2023

(51) Int. Cl.
    *G06F 12/02*     (2006.01)
    *G06F 12/0871*     (2016.01)
    *G06F 13/16*     (2006.01)

(52) U.S. Cl.
    CPC ...... *G06F 12/0238* (2013.01); *G06F 12/0871* (2013.01); *G06F 13/1642* (2013.01); *G06F 13/1668* (2013.01); *G06F 2212/7201* (2013.01)

(58) Field of Classification Search
    CPC ............. G06F 12/0238; G06F 12/0871; G06F 13/1642; G06F 13/1668; G06F 2212/7201
    USPC ....................................................... 711/100
    See application file for complete search history.

(56) References Cited

U.S. PATENT DOCUMENTS

| | | | |
|---|---|---|---|
| 6,920,527 B2 | 7/2005 | Cloutier et al. | |
| 7,136,966 B2 | 11/2006 | Hetrick | |
| 7,490,197 B2 | 2/2009 | Kirshenbaum et al. | |
| 8,639,873 B1 | 1/2014 | Jevans et al. | |
| 8,996,796 B1 | 3/2015 | Karamcheti et al. | |
| 9,081,712 B2 | 7/2015 | Kotzur | |
| 10,223,271 B2 | 3/2019 | Barczak et al. | |
| 10,459,644 B2 | 10/2019 | Mehra et al. | |
| 10,732,878 B1 * | 8/2020 | Muthiah | G06F 12/0246 |
| 10,769,062 B2 | 9/2020 | Subbarao | |
| 10,866,740 B2 | 12/2020 | Benisty et al. | |
| 2006/0155920 A1 | 7/2006 | Smith et al. | |

(Continued)

FOREIGN PATENT DOCUMENTS

CN     102043723 A     5/2011

*Primary Examiner* — Arpan P. Savla
*Assistant Examiner* — Sidney Li
(74) *Attorney, Agent, or Firm* — ARENTFOX SCHIFF LLP

(57) ABSTRACT

Aspects of a data storage device are provided that optimize utilization of a scratchpad memory. The data storage device includes an NVM and a controller which allocates a memory location of the NVM as scratchpad memory for a host. The controller receives a command including data from a submission queue associated with the scratchpad memory, stores the data in the scratchpad memory, and disables first updates to the L2P mapping table for the data in the scratchpad memory across power cycles. The controller also receives commands from other submission queues for other memory locations than the scratchpad memory, stores data in the other memory locations, and stores second updates to a L2P mapping table. The first and second updates may include different data lengths. Thus, the device accounts for differences between scratchpad memory and NVM in at least data alignment, L2P granularity, and response, resulting in efficient scratchpad memory management.

20 Claims, 11 Drawing Sheets

(56) References Cited

U.S. PATENT DOCUMENTS

| | | |
|---|---|---|
| 2007/0271494 A1 | 11/2007 | Gorobets |
| 2008/0082728 A1 | 4/2008 | Traister et al. |
| 2009/0070748 A1 | 3/2009 | Lin et al. |
| 2014/0082323 A1* | 3/2014 | Li .................. G06F 12/0246 |
| | | 711/207 |
| 2015/0161052 A1 | 6/2015 | Seong |
| 2015/0234598 A1* | 8/2015 | Fujimoto ............ G06F 3/0679 |
| | | 711/102 |
| 2015/0309927 A1 | 10/2015 | Sinclair et al. |
| 2017/0068621 A1* | 3/2017 | Watanabe ........... G06F 3/0679 |
| 2017/0090753 A1* | 3/2017 | Benisty ................ G06F 3/061 |
| 2017/0090762 A1 | 3/2017 | Ea et al. |
| 2017/0123991 A1* | 5/2017 | Sela ................... G06F 12/0246 |
| 2017/0177541 A1* | 6/2017 | Berman .............. G06F 3/0656 |
| 2020/0151104 A1* | 5/2020 | Yang .................. G06F 12/0804 |
| 2020/0293444 A1* | 9/2020 | Jain .................... G06F 3/0679 |
| 2020/0334155 A1* | 10/2020 | Alshawabkeh ..... G06F 12/0862 |
| 2021/0109666 A1 | 4/2021 | Palmer et al. |
| 2022/0035738 A1 | 2/2022 | Brandt |

\* cited by examiner

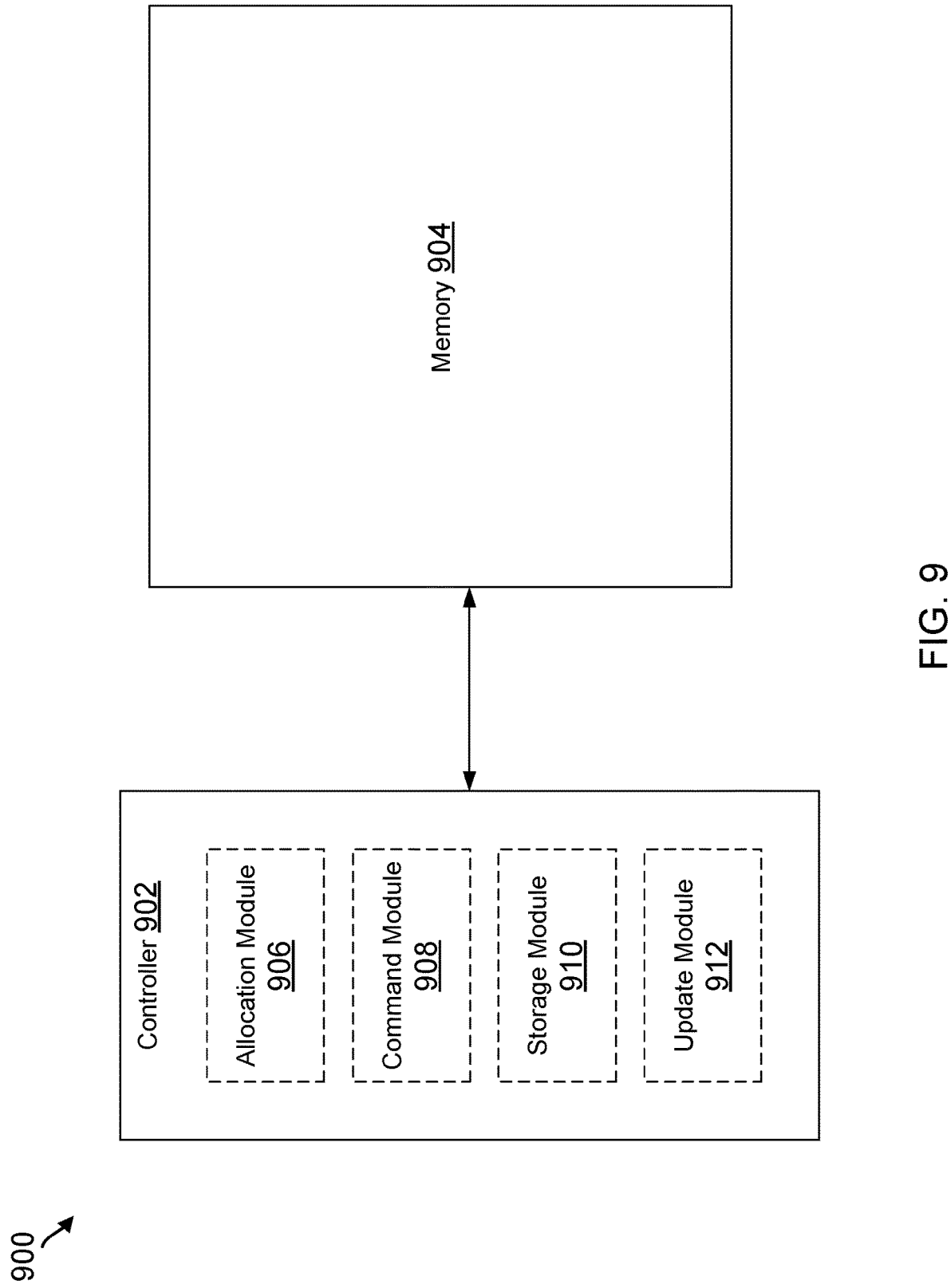

SCRATCHPAD CACHE FOR GAMING AND IoT HOSTS

BACKGROUND

Field

This disclosure is generally related to electronic devices and more particularly to data storage devices.

Introduction

Data storage devices (DSDs) enable users to store and retrieve data. Data storage devices may include hard disk drives (HDDs), solid state drives (SSDs), tape drives, hybrid drives, or other non-volatile memory devices. A non-volatile memory generally retains data after a power cycle. An example of a non-volatile memory is a flash memory, which may include array(s) of NAND cells on one or more dies. Flash memory may be found in SSDs, Secure Digital (SD) cards, or other flash storage devices.

A flash storage device may be used as an external source of volatile memory for host data. For example, if the host does not have sufficient internal cache to store host data for a given application, the host may route that data to available memory in the flash storage device for temporary storage. However, external cache sources may be less optimum to use than host internal cache for storing host data, since, for example, writing data to a flash storage device may involve more latency than that of host internal cache and thus may result in a lower quality of service (QoS) than that of internal cache. Therefore, it would be helpful to optimize the use of flash storage devices as volatile memory for a host device.

SUMMARY

One aspect of a data storage device is disclosed herein. The data storage device includes non-volatile memory (NVM) and a controller. The NVM includes a first memory location and a second memory location. The controller is configured to allocate the first memory location of the NVM as scratchpad memory for a host, store first data from the host in the scratchpad memory, and disable a first update to a logical-to-physical (L2P) mapping table for the first data in the scratchpad memory across power cycles. The controller is also configured to store second data from the host in the second memory location and store a second update to the L2P mapping table for the second data in the second memory location. The first update includes a first data length, and the second update includes a second data length different than the first data length.

Another aspect of a data storage device is disclosed herein. The data storage device includes a NVM and a controller. The NVM includes a first memory location and a second memory location. The controller is configured to allocate the first memory location of the NVM as scratchpad memory for a host, receive a first command including first data from a first submission queue associated with the scratchpad memory, store the first data in the scratchpad memory, and disable an update to a L2P mapping table for the first data in the scratchpad memory across power cycles. The controller is also configured to receive a second command including second data from a second submission queue associated with the NVM and store the second data in the second memory location.

A further aspect of a data storage device is disclosed herein. The data storage device includes a NVM including a first memory location and a second memory location. The storage device includes means for allocating the first memory location of the NVM as scratchpad memory for a host. The data storage device includes means for receiving a first command including first data from a first submission queue associated with the scratchpad memory and a second command including second data from a second submission queue associated with the NVM. The data storage device includes means for storing the first data in the scratchpad memory, the second data in the second memory location, and an update to a L2P mapping table for the second data in the second memory location. The data storage device includes means for disabling another update to the L2P mapping table for the first data in the scratchpad memory across power cycles. The update includes a first data length and the another update includes a second data length different than the first data length.

It is understood that other aspects of the data storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein:

FIG. 9 is a conceptual diagram illustrating an example of a controller that optimizes utilization of a scratchpad memory in the data storage device of FIG. 1.

DETAILED DESCRIPTION

Figure 1:
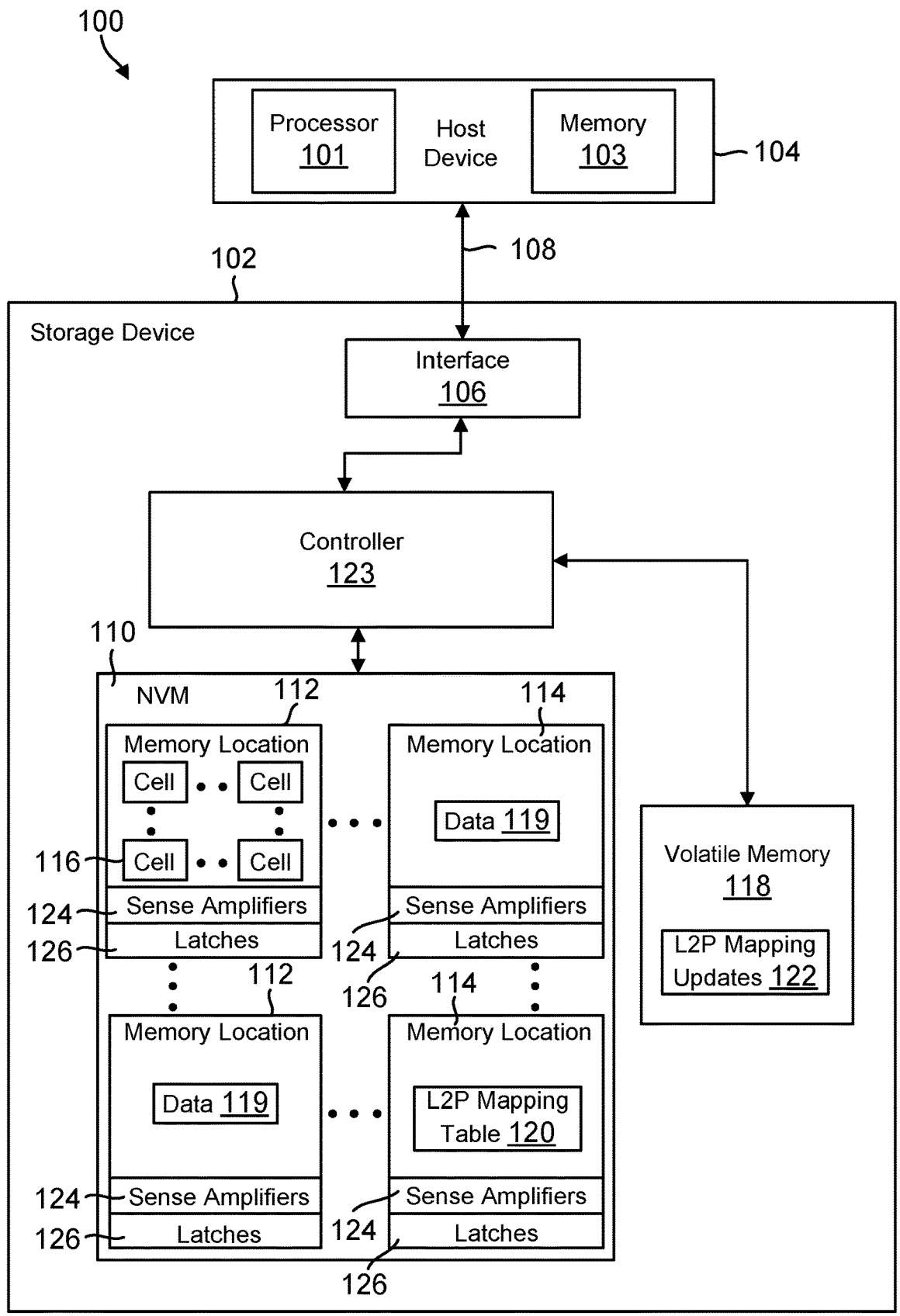
FIG. 1 is a block diagram illustrating an exemplary embodiment of a data storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a data storage device in communication with a host device will be presented. These aspects are well suited for flash storage devices, such as solid-state devices (SSDs) and Secure Digital (SD) cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

To utilize a data storage device as an external source of volatile memory for a host, the host may request the data storage device to support a scratchpad session. A scratchpad session may be a mode, setting, or other configuration in which the data storage device prevents data stored in one or more memory locations in non-volatile memory (NVM) from being read by the host across power cycles of the data storage device, effectively treating those memory locations like volatile memory. In the scratchpad session, a controller of the data storage device configures a memory location in NVM to function as a scratchpad, by preventing commitment of data stored in that memory location across power cycles (e.g., like random access memory (RAM)). The data storage device is configured to prevent logical-to-physical (L2P) mapping updates of data stored in this memory location from persisting across power cycles during the scratchpad session. The L2P references of the data from the host are lost after a power cycle, either automatically due to L2P increments in RAM, or voluntarily through losing references from L2P updates in NVM, causing the data stored in that memory location to be invalidated and allowing new data to be written without the need to perform garbage collection for that memory location. During the scratchpad session, the data storage device may operate normally with respect to the other memory locations (e.g., as NVM), allowing data stored in those locations to persist across power cycles.

Scratchpad sessions are effective for hosts having strict cache requirements (e.g., gaming hosts or Internet of Things (IoT) hosts). For example, certain application programs such as games may require a large amount of RAM (e.g., 8 to 16 GB) to operate with high quality of service (QoS), and therefore if the host does not have enough cache to meet this expected level of service, then the host may utilize the data storage device as an external cache using the scratchpad mode. Scratchpad sessions thus not only have the purpose of extending host cache, but also enable hosts with smaller hardware footprints such as IoT systems to support these high RAM applications.

However, conventional data management techniques for NVM may not be efficient for scratchpad sessions. Typically, when a host issues requests to a data storage device, these requests are commands to read or write data to NVM in the data storage device, and the data storage device may be configured to manage the data accordingly. For example, if the controller receives a write command including sequential data, the controller may store that data in certain blocks allocated specifically for sequential data, while if the controller receives a write command including random data, the controller may store that data in other blocks allocated specifically for random data. The controller may also apply different L2P policies to map logical addresses of sequential and random data respectively to physical addresses of the different blocks or perform other conventional data management techniques for data in NVM of the storage device. However, while such data management techniques may be effective for typical NVM data (non-volatile data), these techniques may not necessarily be efficient for scratchpad (volatile) data, since this type of data may have different use cases or system requirements than non-volatile data. For example, scratchpad data may be intended to be accessed with reduced latency compared to non-volatile data, and therefore it may be helpful for the data storage device to apply different data access or management techniques for this data than for typical non-volatile data to accomplish this reduced latency. For instance, the data storage device may apply a NAND trim function (e.g., a program or read operation that writes or reads data in a much faster manner although at a cost of endurance to the block) or utilize burst blocks (e.g., fast trim single-level cell (SLC) blocks which provide burst performance to the host) in order to reduce latency for scratchpad data access.

Additionally, it may be desirable to handle scratchpad data differently than non-volatile data in terms of data alignment, L2P granularity, and response. First, with respect to data alignment, L2P mapping tables are usually aligned to flash management units (FMU) or fragments of a certain data length, such as 4 KB including eight 512 byte sectors. Regardless of whether the host requests to store sequential data in large chunks (e.g., 128 KB, 256 KB, etc.) or in small chunks (e.g., 4 KB, 8 KB, etc.), in either case, the host requests are generally divisible by the FMU length (e.g., 4 KB). This divisibility may be effective for typical NVM usage, since non-volatile data is generally accessed in multiples of 4 KB or other FMU size in conventional storage devices. However, if the host is utilizing the data storage device for volatile memory, which is a different use case than for NVM, then this typical FMU length may no longer be sufficient. For example, compared to nonvolatile data, the host may intend to cache or access a smaller amount of scratchpad data at a time (e.g., one or two sectors), or a quantity of scratchpad data otherwise unaligned with the FMU length (e.g., nine sectors). Thus, it may be desirable to have different data alignments and control data management for scratchpad memory than the typical FMU alignment for NVM. Moreover, while single sector accesses may occur in typical NVM usage, such accesses are infrequent due to their resulting in lower QoS than that of larger 4 KB or other FMU size accesses. In contrast, single sector accesses may be more frequent in cache use cases, and thus it would be helpful to have different data alignments for scratchpad memory to address the lower QoS associated with such accesses.

Second, with respect to L2P granularity, typically when the device writes a FMU (e.g., 4 KB or eight 512 byte sectors) to the NVM in response to a nonvolatile memory request, the associated L2P entry similarly includes a data length equal to the FMU size. Thus, whenever 4 KB of data is written, the data storage device may perform a L2P mapping update indicating that particular 4 KB of data has been stored in an associated physical location. However, for scratchpad memory requests, the data requested to be written to cache may frequently have smaller granularity than this FMU size, such as 1 sector. In such case, if the typical L2P FMU granularity used for non-volatile data was also used for scratchpad data, then the data storage device may end up performing inefficient L2P mapping updates. For example, the data storage device would write data 1 sector at a time to volatile memory, consolidate L2P updates for each written sector into a single 4 KB entry once eight sectors have been written, and then discard any intermediate L2P entries prior to writing of the eight sectors. While such a design may be acceptable for non-volatile data requests requiring less QoS, the overhead involved in such design may not be acceptable for scratchpad memory requests which typically require higher QoS. Thus, it may be desirable to have different L2P granularity for scratchpad memory than the typical L2P granularity for NVM.

Third, with respect to response, when the data storage device generally handles responses to nonvolatile requests, the data storage device considers these commands to be on par with each other (e.g., of similar priority). Thus, from the time a host submits a command to the device in a submission queue, the device may pick that command or other par commands from that queue or other submission queues based on a current state of the device, as well as determine which commands in the submission queues to execute in a priority order. After the command is eventually picked up from its submission queue, the data storage device may perform the actual input/output (I/O) of data in the command, again based on the current state of the storage device. While such overall device response may be sufficient for nonvolatile requests, this response may be inefficient for scratchpad memory requests. For example, scratchpad memory requests may not be on par with NVM requests as they may for example require higher priority response handling. Thus, the typical overall device response may not be sufficient if higher priority, scratchpad requests are placed in the same submission queues as other lower priority requests for non-volatile data. Thus, it may be desirable to have different response handling for scratchpad memory than the typical response handling applied for NVM.

Accordingly, to account for one or more of the aforementioned differences between scratchpad memory and typical NVM (e.g., use cases, system requirements, alignment, granularity, response, etc.), the data storage device of the present disclosure may be optimized for scratchpad data and memory handling. In one example, the host may segregate its data based on different data requirements (e.g., fast RAM access or slow RAM access). For instance, the host may use its own RAM for fast data access and the scratchpad (which may be abstracted as device RAM from the host perspective) for slow data access. The host may have a driver including segregation logic which groups one set of data structures for storage in host RAM and another set of data structures for storage in the scratchpad in the event the host does not have sufficient RAM for a given application. The host may determine the best data structure candidates for host cache and for the scratchpad based, for example, on priority of the data in the data structures. Whenever the host intends to store data, the host may check the structure and priority of that data and route the data to the host RAM or to the storage device for storage in scratchpad blocks accordingly.

In another example, the data storage device may leverage a function of the scratchpad as a filler or temporary extension of the host cache by considering scratchpad memory requests from host central processing units (CPUs), graphics processing units (GPUs), or other host processors connected to the data storage device differently than nonvolatile data requests in typical NVM submission queues. In particular, the data storage device may include one or more scratchpad submission queues, or an interface between the host and the data storage device may include such scratchpad submission queue(s), which stores scratchpad (volatile) data requests. The system may include multiple scratchpad submission queues with different weightages (priority) respectively for various hosts or processors connected to the data storage device, where the data storage device may process more commands at a time from scratchpad submission queues with higher weightages than from scratchpad submission queues with lower weightages. The system may also include multiple such scratchpad submission queues with different weightages respectively for hosts or clients. For purposes of this disclosure, a client may be a host including various processors, and each processor of the client may also be a host. Clients or hosts with higher I/O requirements (e.g., gaming hosts requiring faster data rates) may be associated with higher weightages than clients or hosts with lower I/O requirements (e.g., media processing hosts allowing for slower data rates). If there are multiple host processors (e.g., CPUs, GPUs, etc.) of multiple clients connected to the data storage device, then each of these hosts or processors may be associated with a separate scratchpad submission queue, and each client including its respective hosts or processors may be associated with a different pre-determined or configured priority for its respective scratchpad submission queue. The data storage device may thus handle scratchpad requests in scratchpad submission queues for different clients or hosts/processors with different priorities. In any event, the scratchpad submission queue(s) may be configured with higher priority than the conventional NVM, weighted submission queues associated with each client or host/processor which contain non-volatile data requests.

In a further example, the data storage device may apply different L2P granularities for scratchpad data than for typical nonvolatile data. As previously described, while applying a 4 KB granularity as a fundamental unit (e.g., FMU size) for L2P entries in nonvolatile memory may be effective for non-volatile data, such granularity may be inefficient for L2P entries associated with scratchpad data. Thus, the data storage device may apply a different fundamental unit for L2P entries in scratchpad memory than for non-volatile data in the NVM. For example, in a 256 GB storage device, if the data storage device allocates 16 GB of the NVM as scratchpad memory, then instead of having a 4 KB fundamental unit for L2P entries associated with data in that 16 KB region, the data storage device may apply a sector (e.g., 512 bytes) as a fundamental unit for L2P entries associated with data in the scratchpad region. Thus, rather than creating one L2P entry for 4 KB of data in NVM (as typically performed for non-volatile data), the data storage device may instead create one L2P update entry for a sector of data (or other amount of data unaligned to the FMU size) stored in the logical region allocated to the scratchpad. The data storage device may configure the L2P granularity for scratchpad data requests to be equivalent to the data alignment or access granularity of data stored in the scratchpad area (e.g., one sector). As a result, the device may track scratchpad requests in the L2P updates at the sector level (at least), thereby allowing individual sectors to be easily accessed from the data storage device in response to host reads. In contrast, L2P entries for NVM requests in logical regions outside the scratchpad may continue to maintain their typical 4 KB granularities. Additionally, an error correction code (ECC) engine of the data storage device may be configured to handle such sector level requests without dependency on other sectors in the encoding or decoding of data associated with such requests. For instance, before storing or retrieving a sector of data in the scratchpad memory, the ECC engine may respectively encode or decode the data using parity bits which quantity is a function of the sector length, rather than a page length or FMU length, in order to handle error correction at maximum efficiency.

FIG. 1 shows an exemplary block diagram 100 of a data storage device 102 which communicates with a host 104 (also "host device") according to an exemplary embodiment. The host 104 and the data storage device 102 may form a system, such as a computer system (e.g., server, desktop, mobile/laptop, tablet, smartphone, etc.). The components of FIG. 1 may or may not be physically co-located. In this regard, the host 104 may be located remotely from data storage device 102. Although FIG. 1 illustrates that the host 104 is shown separate from the data storage device 102, the host 104 in other embodiments may be integrated into the data storage device 102, in whole or in part. Alternatively, the host 104 may be distributed across multiple remote entities, in its entirety, or alternatively with some functionality in the data storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the data storage device 102, or multiple data storage devices communicating with the host(s).

The host 104 may store data to, and/or retrieve data from, the data storage device 102. The host 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host 104 to store data or instructions processed by the host or data received from the storage device 102. In some examples, the host memory 103 may include NVM, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of NVM devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both NVM and volatile memory, whether integrated together or as discrete units.

The host interface 106 is configured to interface the data storage device 102 with the host 104 via a bus/network 108, and may interface using, for example, Ethernet or Wi-Fi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the data storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, Wi-Fi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The data storage device 102 includes a memory. For example, in the exemplary embodiment of FIG. 1, the data storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the data storage device 102 or user data received from the host for storage in the data storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The data storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the data storage device 102, the volatile memory 118 may be integrated into the controller 123.

The memory (e.g., NVM 110) is configured to store data 119 received from the host 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the data storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
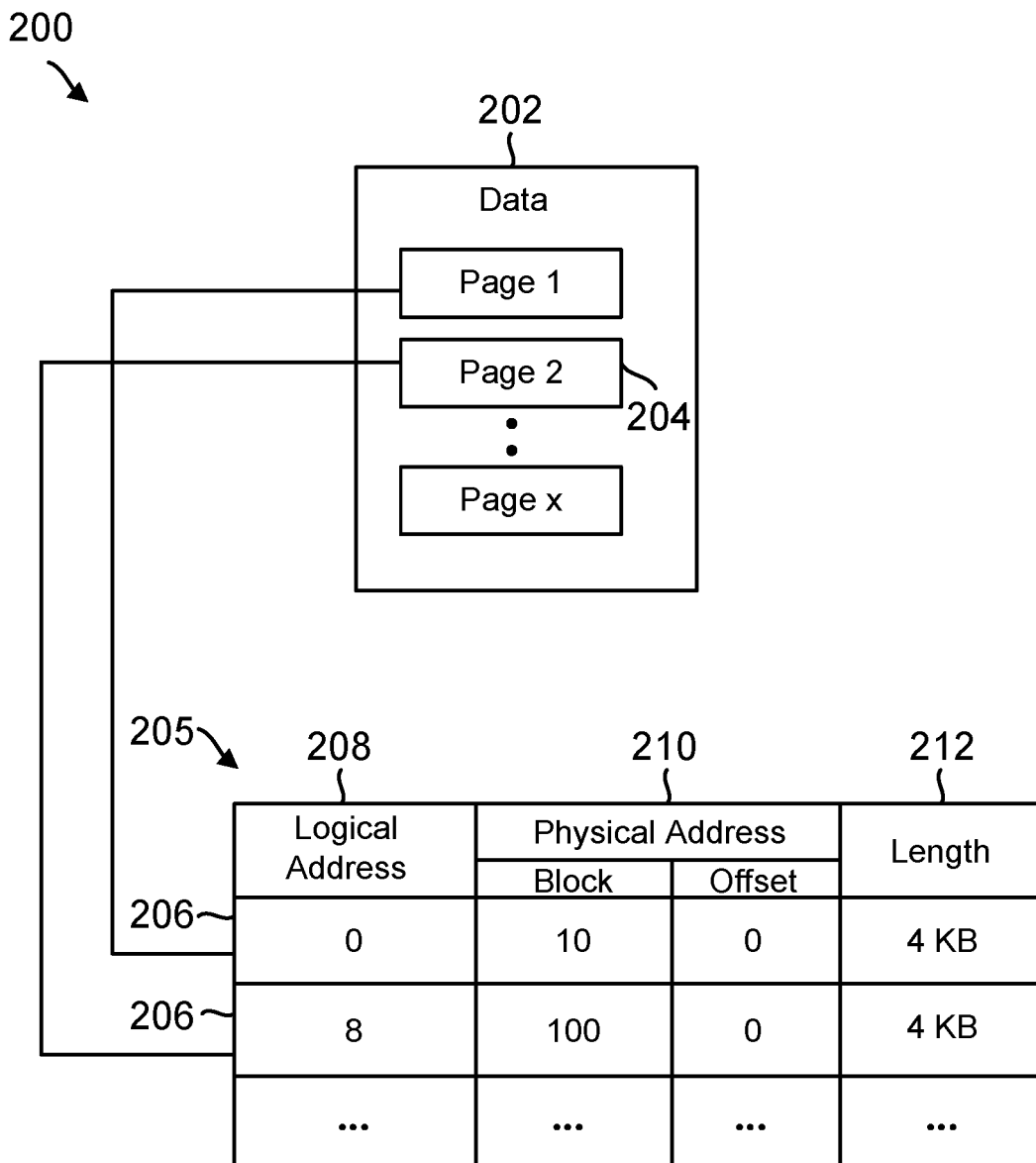
FIG. 2 is a conceptual diagram illustrating an example of logical-to-physical mapping updates in a volatile memory of the data storage device of FIG. 1.

FIG. 2 is a conceptual diagram 200 of an example of an L2P mapping table 205 illustrating the mapping of data 202 received from a host to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a LBA 208, a physical address 210 associated with the data written to the NVM, and a length 212 of the data. LBA 208 may be a logical address specified in a write command for the data received from the host. Physical address 210 may indicate the block and the offset at which the data associated with LBA 208 is physically written. Length 212 may indicate a size of the written data (e.g., 4 KB or some other size).

Referring back to FIG. 1, the volatile memory 118 further stores L2P mapping updates 122 (also referred to as incremental updates) for the data storage device 102. The L2P mapping updates 122 are entries showing the mapping of logical addresses specified for data written from the host 104 to physical addresses in NVM 110 indicating the location(s) where the data is stored. This mapping may be performed by the controller 123. The L2P mapping updates 122 may be stored in the form of a table or other data structure which includes a logical address associated with each memory location 112 in NVM where data is being read.

Figure 3:
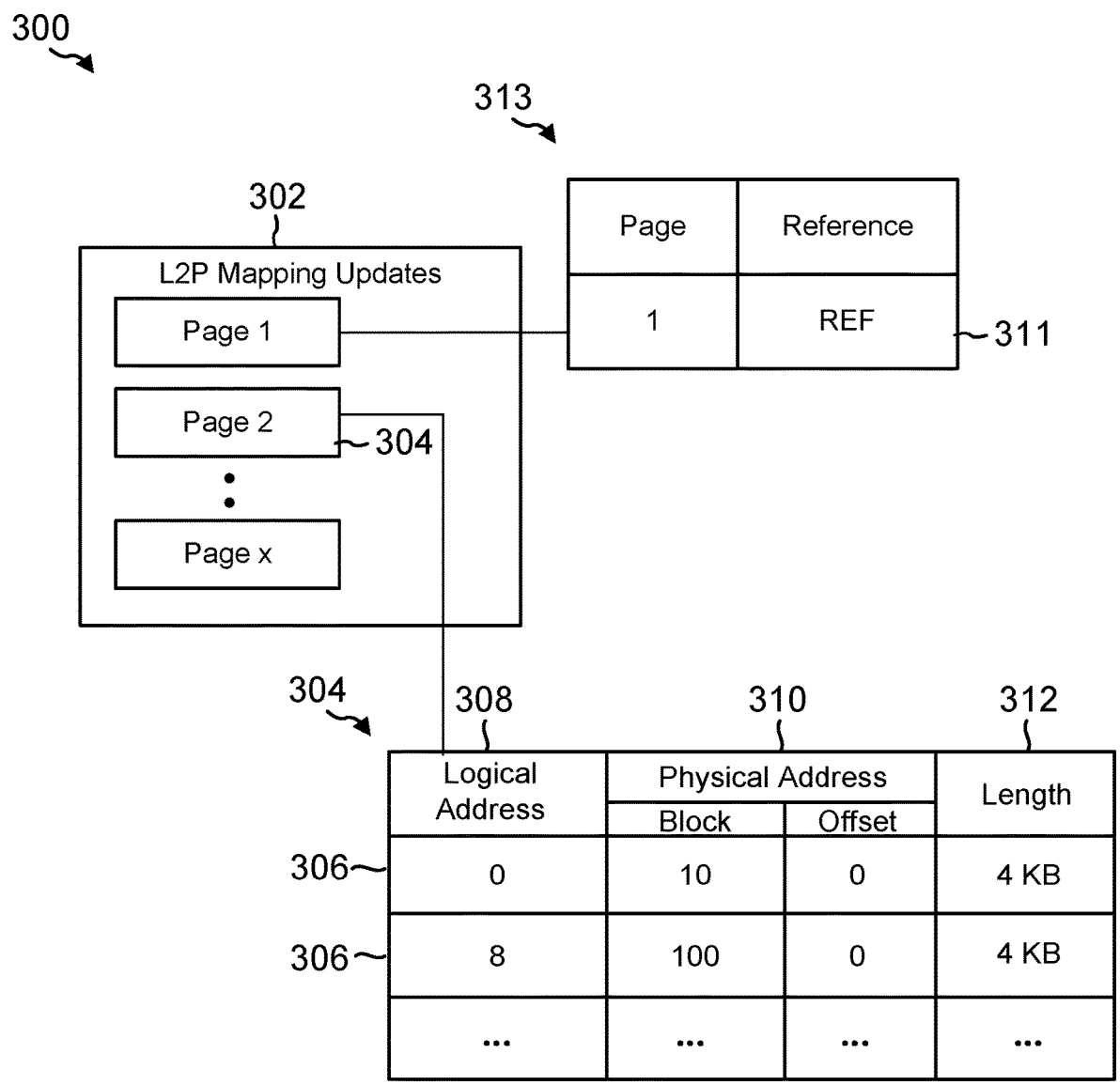
FIG. 3 is a conceptual diagram illustrating an example of a logical-to-physical mapping table in a non-volatile memory (NVM) of the data storage device of FIG. 1.

FIG. 3 is a conceptual diagram 300 illustrating an example of L2P mapping updates 302 in the volatile memory of FIG. 1. L2P mapping updates 302 may correspond to L2P mapping updates 122 or incremental updates in FIG. 1. Incremental updates are L2P mapping updates or entries that are stored in the volatile memory and may be associated with one or more pages. In one exemplary embodiment, the L2P mapping updates 302 may include a plurality of pages 304 (e.g., pages 1 to x, where x may be predefined according to a size of the volatile memory). Each page 304 may include one or more entries 306 identifying a logical address 308 (e.g., an LBA) and a physical address 310 associated with data to be written to the NVM. Logical address 308 may be a logical address specified in a write command for data received from a host. Physical address 310 may indicate the block and the offset at which the data associated with logical address 308 is physically written. Thus, an incremental update may be an entry 306, a set or subset of entries in a page 304, or a set or subset of entries from multiple pages 304.

Pages 304 may be swapped from volatile memory to the NVM due to lack of cache (e.g., page 1 in FIG. 3). When swapping occurs, these pages 304 may be associated with a reference 311 stored in a log table 313 (e.g., a Master Table or a master index page (MIP) block). When the controller receives a read command from the host specifying a LBA associated with a page which was swapped out of volatile memory, reference 311 may assist the controller in identifying the page 304 which was swapped. For example, FIG. 3 illustrates a non-limiting example where page 1 was previously swapped into NVM to free up space in the volatile memory.

Referring back to FIG. 1, the NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g., readable as a '0' or a '1'), and the sensed data is stored in the data latches 126. The data is then transferred from the data latches 126 to the controller 123, after which the data is stored in the volatile memory 118 until it is transferred to the host 104. When data is written to the cells 116 of the memory location 112, the controller 123 stores the programmed data in the data latches 126, and the data is subsequently transferred from the data latches 126 to the cells 116.

The data storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110, and the L2P mapping updates 122 in the volatile memory 118 or the NVM 110, when reading or writing data to the cells 116. For example, the controller 123 may receive logical-to-physical address mappings from the volatile memory 118 or NVM 110 in response to read or write commands from the host 104, identify the physical addresses mapped to the logical addresses identified in the commands (e.g., translate the logical addresses into physical addresses), and access or store data in the cells 116 located at the mapped physical addresses.

The controller 123 is further configured to allocate one of the memory locations 112 for storing data received from the host 104 in response to a write command by the host 104. For example, the controller may allocate one or more cells 116 in a block of die 114 to store the data. The controller 123 is also configured to store L2P mapping updates 122 in the volatile memory 118. For example, the controller may store an update to the logical-to-physical address mapping of the data received from host 104 in the volatile memory 118. The controller 123 is also configured to store the data received from host 104 in the allocated memory location. For example, the controller may store the data in the cells 116 of the block previously allocated by the controller. The controller 123 is also configured to store L2P mapping updates 122 in the L2P mapping table 120. For example, after accumulating multiple updates in the volatile memory 118, the controller may merge or flush the updates to the L2P mapping table to enable the updates to persist across power cycles of the storage device.

The controller 123 and its components may be implemented with embedded software that performs the various functions of the controller described throughout this disclosure. Alternatively, software for implementing each of the aforementioned functions and components may be stored in the NVM 110 or in a memory external to the data storage device 102 or host 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host 104 stores data in the data storage device 102 by sending a write command to the data storage device 102 specifying one or more logical addresses (e.g., LBAs) as well as a length of the data to be written. The host interface 106 receives the write command, and the controller allocates a memory location 112 in the NVM 110 of data storage device 102 for storing the data. The controller 123 stores the L2P mapping in the volatile memory and subsequently merges the updates to NVM to map a logical address associated with the data to the physical address of the memory location 112 allocated for the data. The controller also stores the length of the L2P mapped data. The controller 123 also stores the data in the memory location 112 by sending it to one or more data latches 126 connected to the allocated memory location, from which the data is programmed to the cells 116.

The host 104 may retrieve data from the data storage device 102 by sending a read command specifying one or more logical addresses associated with the data to be retrieved from the data storage device 102, as well as a length of the data to be read. The host interface 106 receives the read command, and the controller 123 accesses the L2P mapping in the L2P mapping updates 122 or the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 4:
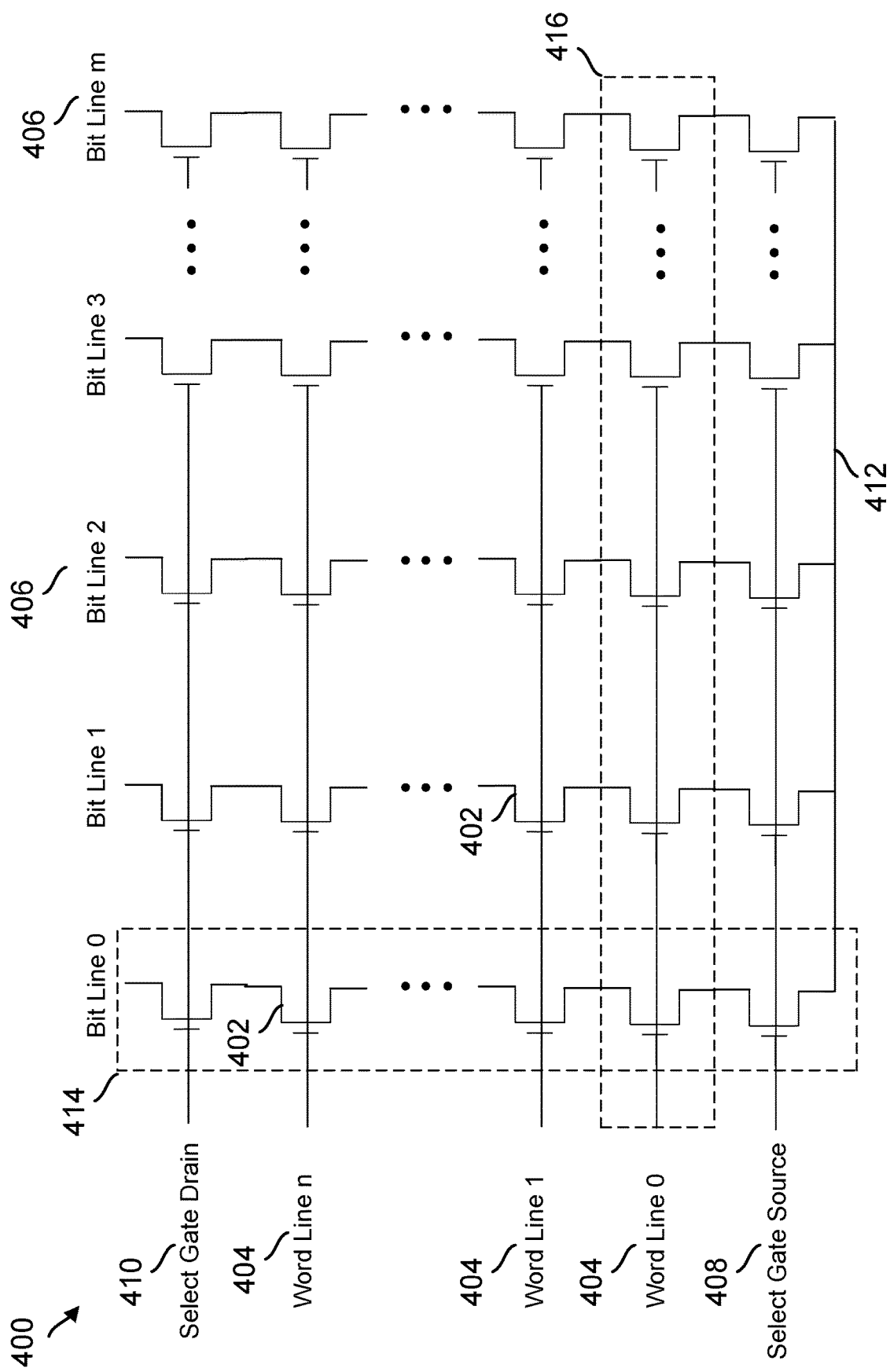
FIG. 4 is a conceptual diagram illustrating an example of an array of memory cells in the data storage device of FIG. 1.

FIG. 4 illustrates an example of a NAND memory array 400 of cells 402. Cells 402 may correspond to cells 116 in the NVM 110 of FIG. 1. Multiple cells 402 are coupled to word lines 404 and bit lines 406. For example, the memory array 400 may include n word lines and m bit lines within a block of the die 114 of the NVM 110, where n and m are predefined according to the size of the block. Each word line and bit line may be respectively associated with a row and column address, which the controller 123 may use to select particular word lines and bit lines (e.g., using a row and column decoder). For example, word lines 0-$n$ may each be associated with their own row address (e.g., word line 0 may correspond to word line address 0, word line 1 may correspond to word line address 1, etc.), and bit lines 0-$m$ may each be associated with their own column address (e.g., bit line 0 may correspond to bit line address 0, bit line 1 may correspond to bit line address 1, etc.). Select gate source (SGS) cells 408 and select gate drain (SGD) cells 410 are coupled to the memory cells 402 on each bit line 406. The SGS cells 408 and SGD cells 410 connect the memory cells 402 to a source line 412 (e.g., ground) and bit lines 406, respectively. A string 414 may include a group of cells 402 (including SGS and SGD cells 408, 410) coupled to one bit line within a block, while a page 416 may include a group of cells 402 coupled to one word line within the block.

Figure 5:
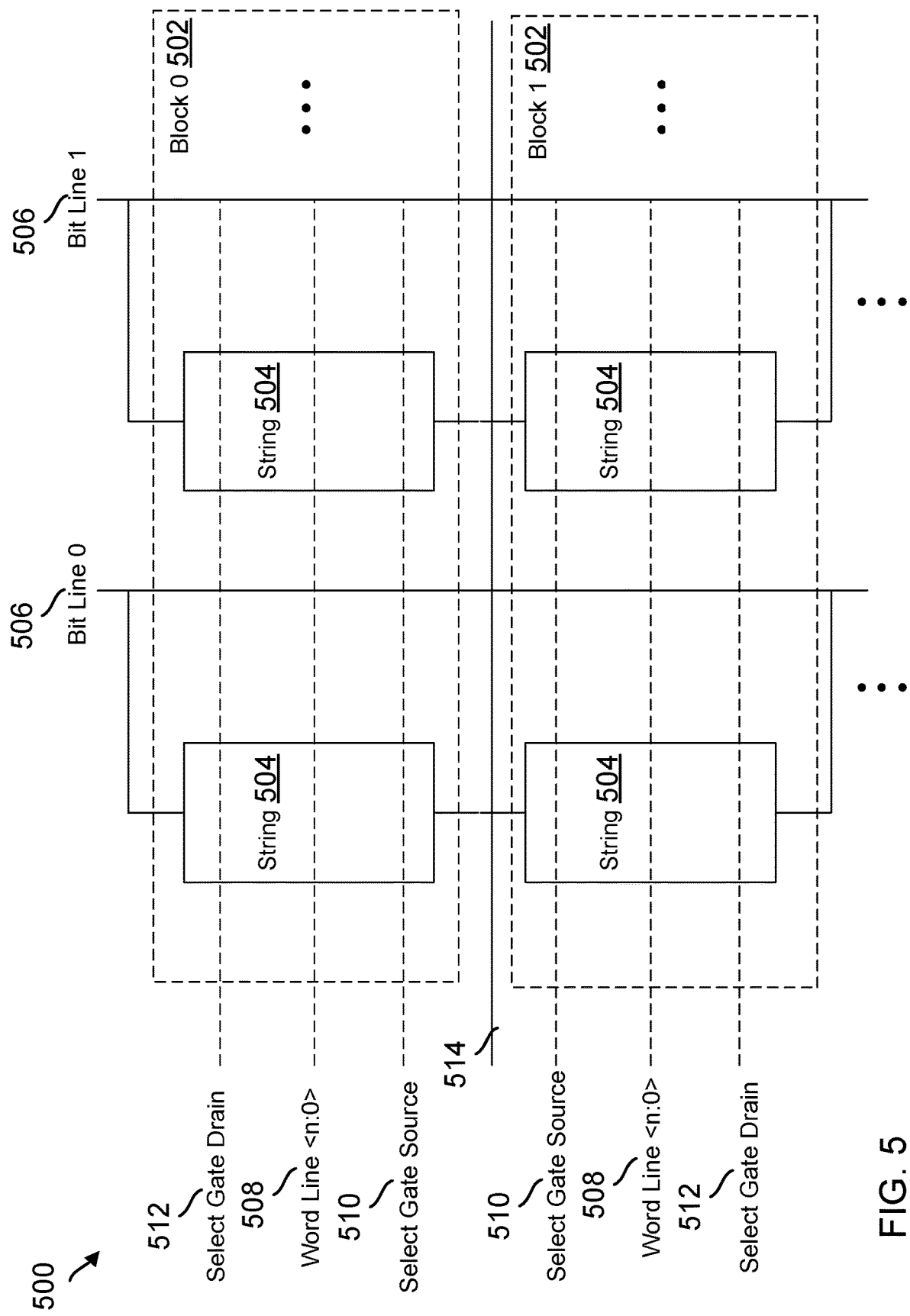
FIG. 5 is a conceptual diagram illustrating an example of an array of blocks in the data storage device of FIG. 1.

FIG. 5 illustrates an example of a NAND memory array 500 of blocks 502 including multiple strings 504. Blocks 502 may correspond to blocks of the die 114 in the NVM 110 of FIG. 1, and strings 504 may each correspond to string 414 in FIG. 4. As in the memory array 400 of FIG. 4, each string 504 may include a group of memory cells each coupled to a bit line 506 and individually coupled to respective word lines 508. Similarly, each string may include a SGS cell 510 and SGD cell 512 which respectively connects the memory cells in each string 504 to a source line 514 and bit line 506.

When the controller 123 reads data from or writes data to a page 416 of cells 116, 402 (i.e., on a word line 404, 508), the controller may send a command to apply a read voltage or program voltage to the selected word line and a pass through voltage to the other word lines. The read or programmed state of the cell (e.g., a logic '0' or a logic '1' for SLCs) may then be determined based on a threshold voltage of the cells 402. For example, during an SLC read operation, if the threshold voltage of a cell 402 is smaller than the read voltage (i.e. current flows through the cell in response to the read voltage), the controller 123 may determine that the cell stores a logic '1', while if the threshold voltage of the cell 402 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 402 on the word line 404, 508 until the cell reaches the threshold voltage, and during an erase operation, the controller may send a command to apply an erase voltage to the block 502 including the cells 402 (e.g. to a substrate of the cells such as a p-well) until the cells reduce back below the threshold voltage (back to logic '1').

For cells that store multiple bits (e.g., MLCs, TLCs, etc.), each word line 404, 508 may include multiple pages 416 of cells 402, and the controller may similarly send commands to apply read or program voltages to the word lines to determine the read or programmed state of the cells based on a threshold voltage of the cells. For instance, in the case of TLCs, each word line 404, 508 may include three pages 416, including a lower page (LP), a middle page (MP), and an upper page (UP), respectively corresponding to the different bits stored in the TLC. In one example, when programming TLCs, the LP may be programmed first, followed by the MP and then the UP. For example, a program voltage may be applied to the cell on the word line 404, 508 until the cell reaches a first intermediate threshold voltage corresponding to a least significant bit (LSB) of the cell. Next, the LP may be read to determine the first intermediate threshold voltage, and then a program voltage may be applied to the cell on the word line until the cell reaches a second intermediate threshold voltage corresponding to a next bit of the cell (between the LSB and the most significant bit (MSB)). Finally, the MP may be read to determine the second intermediate threshold voltage, and then a program voltage may be applied to the cell on the word line until the cell reaches the final threshold voltage corresponding to the MSB of the cell. Alternatively, in other examples, the LP, MP, and UP may be programmed together (e.g., in full sequence programming or Foggy-Fine programming), or the LP and MP may be programmed first, followed by the UP (e.g., LM-Foggy-Fine programming). Similarly, when reading TLCs, the controller 123 may read the LP to determine whether the LSB stores a logic 0 or 1 depending on the threshold voltage of the cell, the MP to determine whether the next bit stores a logic 0 or 1 depending on the threshold voltage of the cell, and the UP to determine whether the final bit stores a logic 0 or 1 depending on the threshold voltage of the cell.

Figure 6:
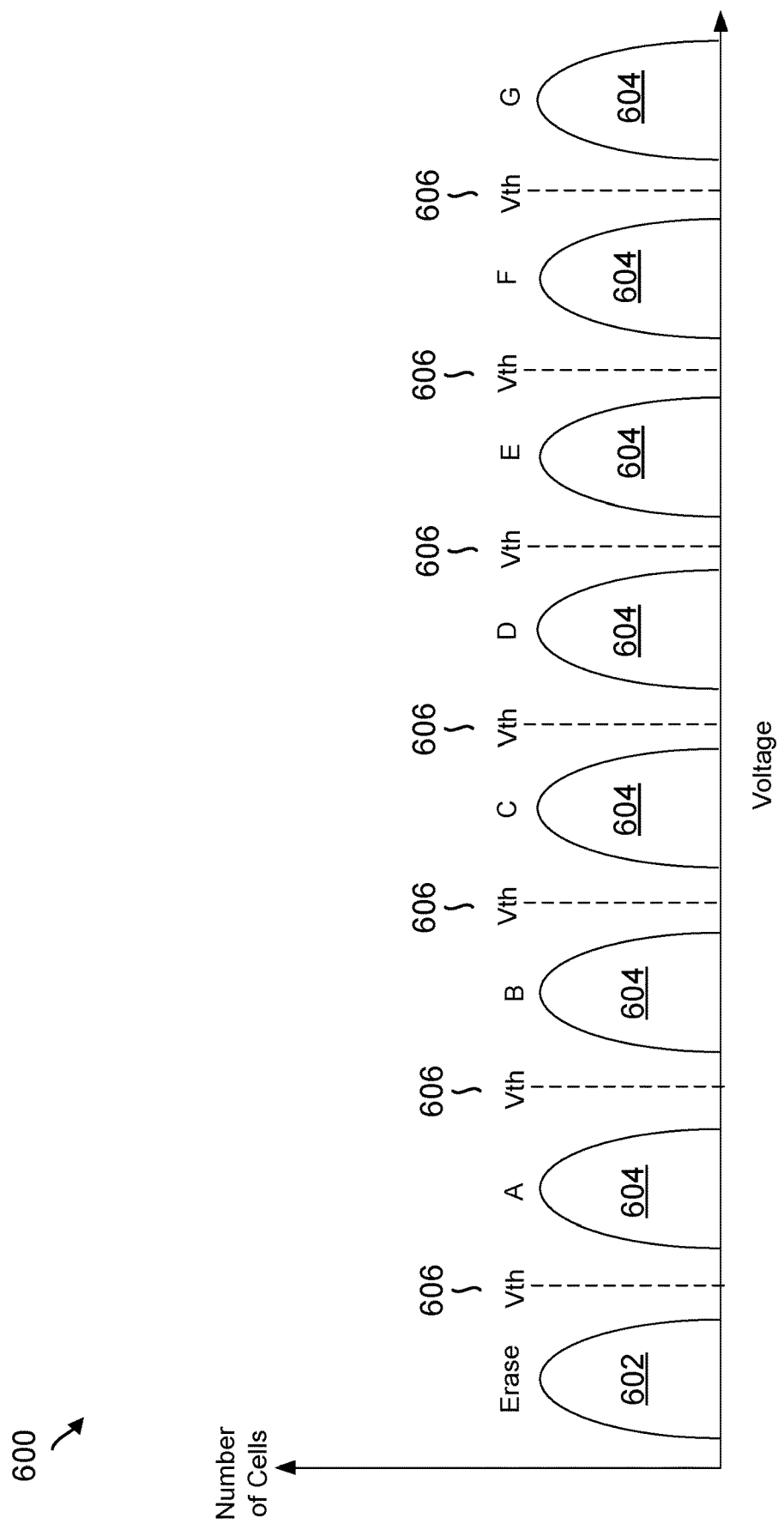
FIG. 6 is a graphical diagram illustrating an example of a voltage distribution chart for triple-level cells in the data storage device of FIG. 1.

FIG. 6 illustrates an example of a voltage distribution chart 600 illustrating different NAND states for TLCs (e.g., cells 116, 402) storing three bits of data (e.g., logic 000, 001, etc. up to logic '111'). The TLCs may include an erase state 602 corresponding to logic '111' and multiple program states 604 (e.g., A-G) corresponding to other logic values '000-110'. The program states 604 may be separated by different threshold voltages 606. Initially, the cells 116, 402 may be in the erase state 602, e.g., after the controller 123 erases the block 502 including the cells. When the controller 123 programs LPs, MPs, and UPs as described above, the voltages of the cells 116, 402 may be increased until the threshold voltages 606 corresponding to the logic values to be stored are met, at which point the cells transition to their respective program states 604. While FIG. 6 illustrates eight NAND states for TLCs, the number of states may be different depending on the amount of data that is stored in each cell 116, 402. For example, SLCs may have two states (e.g., logic 0 and logic 1), MLCs may have four states (e.g., logic 00, 01, 10, 11), and QLCs may have sixteen states (e.g., erase and A-N).

Referring back to FIGS. 1-6, in default operation of the data storage device 102, when a write command is received, the controller 123 stores L2P mapping update 122, 302 in the volatile memory 118. As data to be written is received from host 104 over host interface 106 and stored (e.g., written or programmed) in cells 402 of blocks 502 with program states 604, new updates or entries 306 are created in the volatile memory 118. If the volatile memory 118 later becomes full (e.g., due to limited cache), the controller 123 may swap a portion of the L2P mapping updates 122, 302 into one or more memory locations 112 of the NVM 110 to free up space in the volatile memory 118. The controller 123 may also store the reference 311 associated with swapped portion in the NVM 110 so that the controller can identify the location of the page in NVM when searching for it in volatile memory after a read command. Before the data storage device powers down, the L2P mapping updates 122, 302 in the volatile memory 118 and the NVM 110 as well as the references 311 are flushed to or merged with the L2P mapping table 120, 205 in the NVM. Thus, the written data in the NVM is maintained and can be read across power cycles of the data storage device 102.

In addition to allowing the host 104 to write data to and read data from the data storage device 102 according to a default operation such as described above, the controller 123 may also configure the data storage device to support a scratchpad session. In particular, the controller 123 may allocate a region or namespace of the NVM 110 (e.g., one of the memory locations 112) for scratchpad use, in response to an instruction received from the host to start a scratchpad session. Moreover, when the data storage device 102 is powered down or the controller 123 receives an instruction from the host 104 to end the scratchpad session, the controller 123 does not merge the L2P mapping updates 122, 302 associated with the allocated logical region(s) (in the volatile memory 118) to the L2P mapping table 120 (in the NVM 110). Instead, the controller 123 allows the updates 122, 302 that were stored in volatile memory 118 to be discarded. Additionally, any references to updates 122, 302 that were swapped from the volatile memory 118 into NVM 110 (due to limited cache) are also discarded without merging into the L2P mapping table 120, 205, thereby invalidating any associated data stored in that region of the NVM 110.

Moreover, when the limited cache of the volatile memory 118 is full, the controller does not merge the L2P mapping updates 122, 302 with the L2P mapping table 120, 205 in the NVM 110. Instead, the controller 123 flushes one or more portions of the L2P mapping updates 302 (e.g., entries 306 or pages 304) to the NVM to be stored in one or more of the allocated memory location(s) 112. For example, the L2P mapping updates 122, 302 may be written to the memory location 112 or control block exclusively allocated for the L2P mapping updates 122, 302. After the scratchpad session ends, the L2P mapping updates 122, 302 in the memory location 112 are invalidated in response to a firmware data update, since the updates are never merged into the L2P mapping table 120, 205. As a result, the controller 123 may determine to write data or L2P mapping updates to the memory location 112 or block allocated for scratchpad memory using a trim command, which allows information to be written with lower latency although at a cost of endurance of the block, since the host 104 does not expect the block to retain the stored information across power cycles. Additionally, when the controller 123 receives an instruction from the host 104 to end the scratchpad session, the controller 123 may conveniently erase the data stored in the allocated block(s) for scratchpad memory and can subsequently reuse the memory location 112 for future scratchpad sessions.

Furthermore, the controller 123 may perform additional functions to optimize scratchpad memory handling and use. In one example, the controller may receive from the host 104 segregated or grouped data structures including NVM scratchpad data for optimal performance. For instance, the controller 123 may receive segregated scratchpad data in a request or command from the host 104 to store the data 119 in scratchpad memory, based on a host determination of the best candidates for storage in the host cache and the scratchpad memory. The segregated or grouped data structures may also be associated with applications having different requirements in terms of access granularity of scratchpad data. For instance, the controller may receive larger granular transactions associated with sector-wise transaction requirements as scratchpad requests (e.g., in units of sectors for storage in scratchpad memory), while smaller granular transactions associated with byte-wise transaction requirements may be kept within host data cache (e.g., in units of bytes for storage in host cache). The smaller granular transactions may be kept in host cache, since using the NVM scratchpad for this purpose would lead to poorer QoS for these transactions due to the additional latency involved in using external device cache compared to accessing internal host cache.

The controller 123 may also receive segregated scratchpad data from the host based on a QoS impact of the associated data. For instance, due to the additional latency involved in accessing the scratchpad cache, the QoS associated with a write request to the storage device 102 may be lower than the QoS of a write request to host cache. As a result, even though the host 104 may generally send larger granular transactions (e.g., sector-wise) to the controller for scratchpad memory storage, the host may instead opt to keep large granular transactions in host internal cache for reduced latency if an application associated with those transactions requires a higher QoS. In contrast, for applications requiring a lower QoS, the host 104 may route associated transactions to the data storage device 102 as previously described. Thus, the controller 123 may receive scratchpad data based on a host-identified common ground between QoS and data (transaction) granularity when deciding what sits in host cache versus scratchpad NVM.

The controller 123 may receive segregated scratchpad data from a segregation module of the host 104 for NVM scratchpad services. For example, the segregation module may be a gaming driver or software at the host 104 which may analyze cache requirements and data structures for different application programs (e.g., games and levels). The segregation module may associate data structures with either the host system RAM or the NVM scratchpad memory based on data access granularity and data access latency. The controller may also receive data granularity requirements provided by the segregation module.

In another example, the controller 123 may manage a unique L2P granularity for scratchpad data compared to usual NVM data. For instance, the controller may store scratchpad data with different L2P granularity (e.g., as indicated in L2P incremental update entries) than its typical L2P granularity used for NVM storage, as different requirements may exist for scratchpad access granularity than for NVM access granularity.

Moreover, L2P granularity may be different for different gaming and IoT requirements. For instance, different application programs (e.g., games or levels in games) may be associated with different L2P granularities. For example, 1 sector L2P granularity may be applied for scratchpad data for one game or level, while 8 KB L2P granularity may be applied for scratchpad data associated with another game or level. Different regions of the scratchpad area may also have different L2P incremental update granularity. For example, 1-sector accesses may be applied for one region encompassing 25% of the scratchpad area, while 8 KB accesses may be applied for another region encompassing 75% of the scratchpad area. The different scratchpad area regions (logical regions of the scratchpad area) with different granularities may be for a same client or host, or for different clients or hosts.

Furthermore, L2P granularity may be assisted by the host 104 or determined by the controller 123. For instance, the controller 123 may receive a hint or message from the host 104 regarding how scratchpad data is to be handled, based on the required granularity for data interactions with the scratchpad area. For example, the controller may receive a message from the host to maintain different L2P granularities for different games or levels. Alternatively, the controller may determine the L2P granularity for scratchpad data based on I/O access patterns of scratchpad data. For example, different L2P granularities may be applied for different games in different logical regions of the scratchpad area based on associated I/O access patterns for those games or logical regions.

Additionally, the L2P granularity may support IoT hosts. For instance, the different L2P granularity may support cost-effective IoT hosts with bare minimum cache having applications with very small, associated data access granularities. Moreover, scratchpad cache may serve as a cache margin to support certain application programs (e.g., games or levels) even if sufficient host cache is available for default application programs. Furthermore, IoT sensors may have their firmware upgraded to include the different L2P granularity logic, further improving their value.

In a further example, the controller 123 may receive scratchpad requests from unique submission queues for scratchpad requests to provide scratchpad data access with minimized latency. For instance, a host CPU, GPU, accelerator, or other host processor connected to the data storage device 102 may each have a respective submission queue for scratchpad requests in the scratchpad L2P range. The submission queues may include different weightages for respective clients or host processors. Moreover, multiple submission queues may be associated with individual host processors or clients including multiple host processors. The controller may also manage different scratchpad regions for different clients or hosts.

The controller 123 may handle scratchpad service queues for these host processors (CPU, GPU, accelerators) differently than typical NVM queues. For instance, scratchpad requests may not overlap with NVM commands of respective host processors since these requests are stored separately in respective submission queues of these processors. Moreover, given the purpose of scratchpad memory as a filler for host cache, the controller may prioritize handling commands in scratchpad queues over other NVM queues.

Additionally, the controller 123 may associate different L2P incremental update granularities of the scratchpad memory with respective scratchpad submission queues. This association may last until a power cycle of the data storage device 102. The different L2P granularities may also or alternatively be applied for different scratchpad regions (L2P ranges) based on host assistance, controller determination, or application program (e.g., games or levels). Moreover, the controller may manage multiple scratchpad regions for multiple clients with different L2P or access granularities to minimize latency.

Figure 7A:
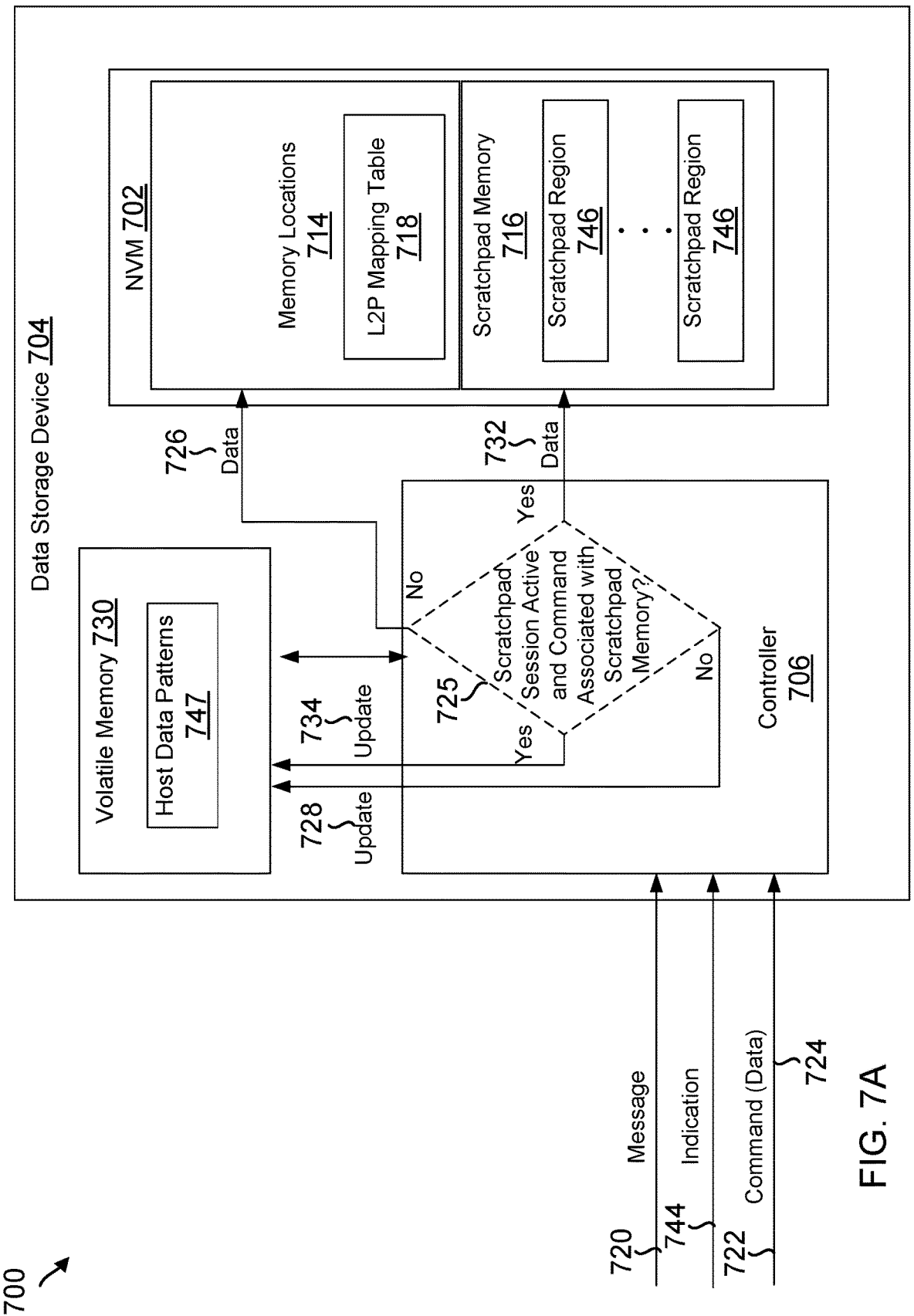
FIGS. 7A-7C are conceptual diagrams illustrating an example of a system that optimizes utilization of a scratchpad memory in the storage device of FIG. 1.
Figure 7B:
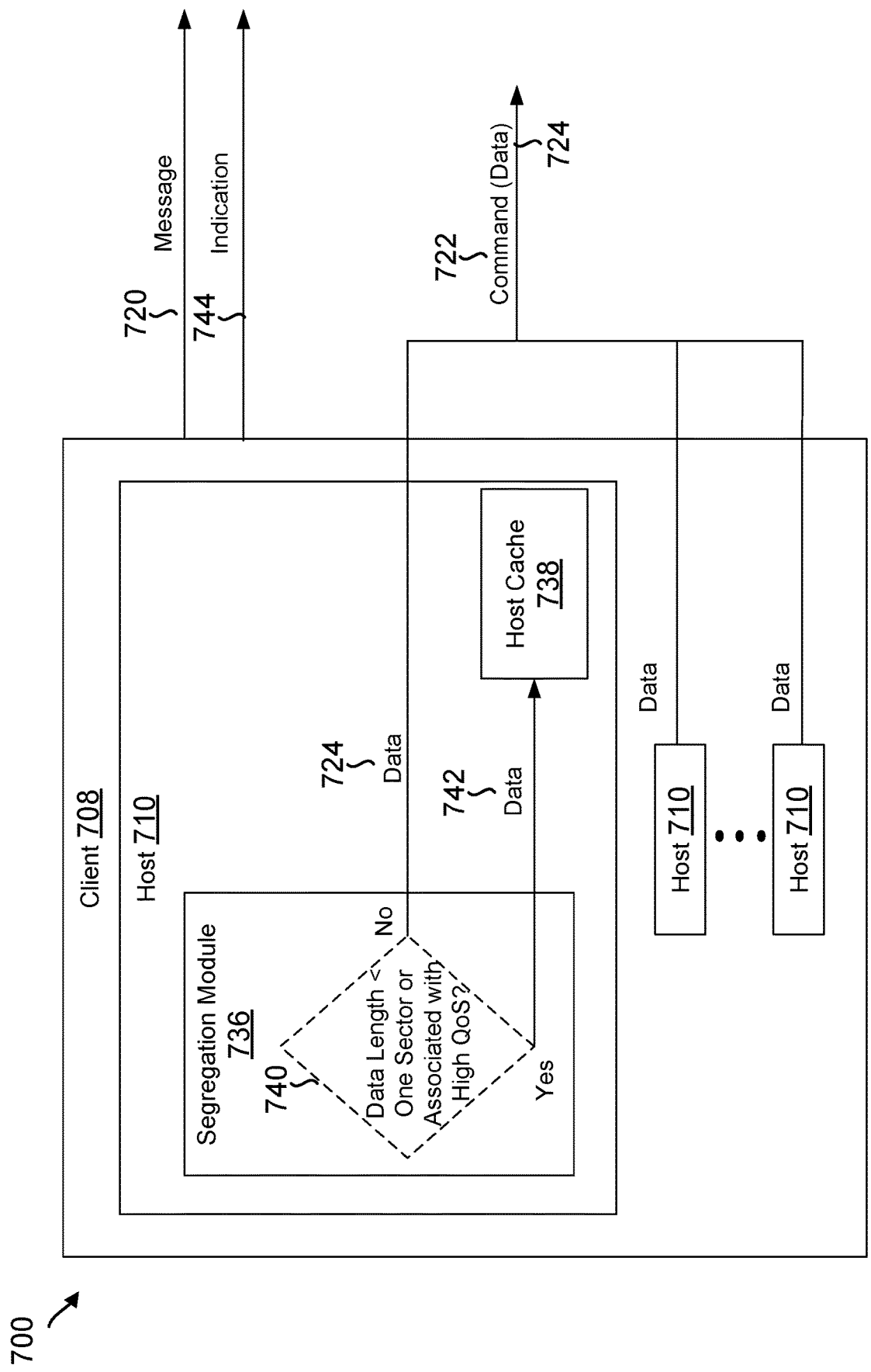
Figure 7C:
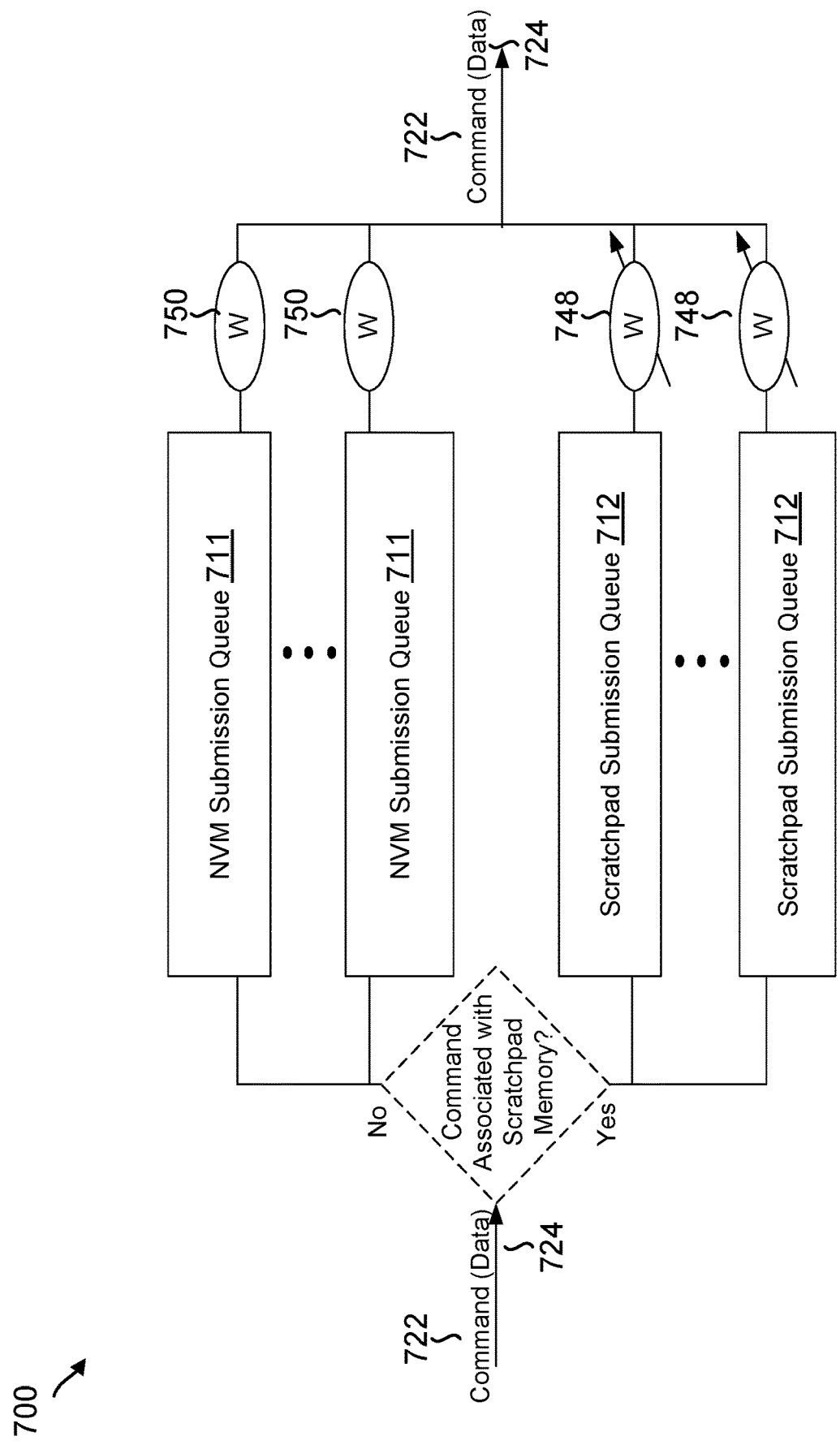

FIGS. 7A-7C illustrate an example of a system 700 that optimizes utilization of a scratchpad memory in a NVM 702 of a storage device 704 (e.g., storage device 102 of FIG. 1). In particular, FIG. 7A illustrates the system 700 including a controller 706 (e.g., controller 123 of FIG. 1) of data storage device 704 which is configured to support a scratchpad session and associate scratchpad data with different L2P granularity than NVM data, FIG. 7B illustrates the system 700 including a client 708 with one or more hosts 710 (e.g., host 104 in FIG. 1) configured to initiate and end scratchpad sessions and perform host data segregation, and FIG. 7C illustrates the system 700 including NVM submission queues 711 for storing host commands directed to the NVM 702 and scratchpad submission queues 712 specifically for storing host commands directed to scratchpad memory.

Initially, referring to FIG. 7A, the NVM 702 may include a plurality of memory locations 714 (e.g., memory locations 112 of FIG. 1) each associated with a physical address. To support a scratchpad session, the controller 706 may allocate one or more of these memory locations 714 as scratchpad memory 716 for the host, while leaving the remaining NVM memory locations 714 as default NVM. The NVM 702 may also store one or more L2P mapping tables 718 (e.g., L2P mapping table 120, 205) in one or more of the NVM memory locations 714.

In default operation, the client 708 or host 710 may first check whether a scratchpad session is active before issuing a write command to the data storage device 704. For example, the host may determine whether the host has sent a message 720 to initiate or end a scratchpad session. If the host did not transmit the message 720, the scratchpad session has ended or is inactive, or the host is otherwise operating outside a scratchpad session, the client or host may place a command 722 in one of the NVM submission queues 711 associated with that client or host instructing the controller 706 to write data 724 to the NVM 702.

After the controller 706 receives the command 722 from the NVM submission queue 711, as illustrated at decision 725, the controller 706 may check whether a scratchpad session is active before handling the data 724. For example, the controller may determine whether the controller has received the message 720 from client 708 or host(s) 710 to initiate or end a scratchpad session. If the controller did not receive the message 720, the scratchpad session has ended or is inactive, or the controller is otherwise operating outside a scratchpad session, the controller 706 may store data 726 (e.g., data 724 in command 722) in one or more of the NVM memory locations 714 allocated for non-volatile data storage. The controller 706 may operate similarly if the controller is operating during a scratchpad session but the command 722 indicates logical addresses outside scratchpad memory 716. The controller may also store L2P mapping updates 728 (e.g., L2P mapping updates 122, 302) in volatile memory 730 (e.g., volatile memory 118 of FIG. 1) which are associated with this data. These L2P mapping updates may later be flushed to the L2P mapping tables 718 in default operation.

On the other hand, if the controller 706 determines at decision 725 that the controller has received message 720 from client 708 or host(s) 710, the scratchpad session is active, or the controller is otherwise operating during a scratchpad session, and if the command 722 also indicates one or more logical addresses that are associated with scratchpad memory 716, then the command 722 may be handled differently. For instance, after the controller 706 receives an instruction from the client or host(s) to start a scratchpad session, the controller may receive host data (e.g., data 724 in command 722) specifying a logical address (e.g., LBA) associated with the scratchpad memory 716. As a result, the controller stores data 732 (e.g., data 724) in the allocated scratchpad memory 716, for example, in a different memory location than memory locations 714. The controller also stores an L2P mapping update 734 (e.g., entry 306 in FIG. 3) in the volatile memory 730. However, the controller disables these L2P updates for the scratchpad memory 716 from being flushed to or merged with the L2P mapping tables 718 during the scratchpad session, and therefore from being stored in the NVM 702 across power cycles of the data storage device.

Referring now to FIG. 7B, client 708 including one or more hosts 710 may each include a segregation module 736 that is configured to perform host data segregation. In one example, there may be many byte-wise transaction requirements in a given application. Since many bytes will be written and rewritten in such application (e.g., 32 or 64 bytes at a time, for example), these transactions are better handled in host cache 738 itself, where these byte-wise transactions are relatively common and thus will be easier to perform in the host cache. Therefore, as illustrated at decision 740, the host segregation module 736 may route byte-wise transactions or other transactions aligned to less than a sector (e.g., data 742 having a data length less than a sector) to host cache 738. In contrast, if the host 710 intended to modify a small quantity of bytes via requests to scratchpad memory rather than host cache 714, such process would be inefficient since the minimum granularity at which the transfer logic of the data storage device works, notwithstanding FMU management, is a sector. Therefore, the host segregation module 736 at decision 740 may route sector-wise transactions (e.g., data 724 having a data length of at least one sector) to the data storage device 704 given this minimum granularity, in the event the host 710 requests this data to be stored in scratchpad memory when the host cache is full. Additionally, other transactions aligned to the FMU size (e.g., data having a data length of an FMU such as 4 KB) may be routed to the data storage device 704 since conventional data storage devices (e.g., SSDs) are designed to store and access data in FMUs.

The host segregation module 736 also considers a balance between QoS impact and transaction granularity in determining which data is stored in host cache 738 and which data is routed to the scratchpad memory 716 in the data storage device 704. For example, host cache 738 may be easier to access than the scratchpad, so for data 724 associated with high QoS applications, the host 710 may determine to route the data in large data sets, sector-wise or FMU-wise (e.g., 4K, 8K, etc.) to host cache 738 rather than the scratchpad memory 716. In contrast, for lower QoS applications, the data 724 may be routed to the scratchpad for efficiency in storage and access.

Referring back to FIG. 7A, when a scratchpad session is active, the controller 706 may associate scratchpad data 732 with a different L2P granularity than that of non-volatile data 726 stored in the NVM 702. For example, while the controller 706 may continue to create 4 KB L2P entries in updates 728 to the L2P mapping table 718 (e.g., L2P mapping table 120, 205) for each data write in the NVM 702 given the FMU size, the controller may create L2P entries of 1 sector each in L2P mapping updates 734 (e.g., L2P mapping updates 122, 302) for data writes to scratchpad memory 716. Thus, when writing a sector of data to the scratchpad memory 716, the controller may translate the L2P entry for that sector itself to identify the physical address of that sector for programming, without having to perform a read modify write (RMW) of other sectors in an entire 4K FMU.

The L2P entries in updates 734 may be based on determination logic at the controller 706. For instance, the controller 706 may determine to create sector-wise L2P entries for data 732 requested to be stored in the scratchpad memory 716. For example, if the controller 706 obtains many data requests for one sector, nine sectors, or other amount of data unaligned to the FMU size (e.g., 8 sectors), the controller may create L2P entries (updates 734) at the sector level. In contrast, if the scratchpad data requests the controller obtains tend to be aligned to the FMU size (4 KB, 8 KB, etc.), the controller may determine not to change the L2P granularity for updates 734 and instead maintain the FMU size L2P granularity for the scratchpad data 732 as well as the non-volatile data 726. Thus, if the data storage device 704 is receiving different types of requests from two different hosts (e.g., sector-wise requests for the scratchpad memory 716 from one host and FMU-wise requests for the scratchpad from another host), the controller may apply different L2P granularities in the scratchpad memory for the different hosts.

Alternatively, the L2P entries in updates 734 may be created based on host assistance. For instance, as illustrated in FIGS. 7A and 7B, in some cases the controller 706 may receive from client 708 or host 710 an indication 744 (e.g., a hint or message) of a specific L2P granularity of scratchpad data 732 to be applied for updates 734. Additionally, different hosts 710 may indicate to the controller 706 to apply different L2P granularities of scratchpad data 732 from different hosts to updates 734. Thus, regardless of whether the L2P entries are device determined or host assisted, the controller may maintain a conventional FMU-wise granularity for non-volatile data 726 (e.g., updates 728), and different L2P granularities than this FMU-wise granularity for the scratchpad data 732 (e.g., updates 734) for different hosts 710.

The L2P granularity for updates 734 may be different for different games or levels (or other application programs), and/or for different scratchpad regions 746 of the scratchpad memory 716. For example, for one game or level, the host 710 may hint to the controller 706 (e.g., in indication 744) to maintain 1 sector L2P granularity for scratchpad data, while for another game or level, the host may instruct the controller 706 (e.g., in indication 744) to maintain an FMU-size L2P granularity (e.g., 8 KB) for scratchpad data. The host 710 may make similar hints to the controller 706 as to which L2P granularity the controller 706 is to maintain for updates 728 and data 726 stored in memory locations 714 outside the scratchpad memory. For example, the host may indicate the controller to maintain a 4 KB L2P granularity for non-volatile data of one application program and to maintain a 16 KB or 32 KB L2P granularity for non-volatile data of another application program. The host may also message the controller (e.g., in message 720 or indication 744) to associate different regions 746 of the scratchpad memory 716 with different L2P granularities. For example, the host 710 may instruct the controller 706 to associate one of the regions 746 including 25% of the scratchpad memory 716 (or other percentage) with the 1 sector L2P granularity and to associate another one of the regions 746 including the remaining 75% of the scratchpad memory (or other percentage) with the 8 KB L2P granularity. The host 710 may provide these hints, messages, or instructions via a vendor specific command (e.g., via message 720 or indication 744).

Alternatively, the controller 706 may itself determine these different L2P granularities for updates 734 for different application programs or scratchpad regions 746, for example, based on a host data pattern 747 (e.g., one or more I/O access patterns) of prior scratchpad requests for different application programs or from different hosts. The controller may acquire and store host data patterns 747 in volatile memory 730 to reference when performing this determination. For instance, the controller 706 may apply a 1 sector L2P granularity to one of the regions 746 (e.g., a region including 25% of the scratchpad memory 716 or other percentage), or for one game or level, in response to a pattern of previous sector-wise requests associated with that portion of the scratchpad memory or with that same game or level. Similarly, the controller 706 may apply an 8 KB L2P granularity to another one of the regions 746 (e.g., a region including 75% of the scratchpad memory 716 or other percentage) or for a different game or level, in response to a pattern of previous FMU-wise requests associated with that portion of the scratchpad area or with that different game or level. In cases where multiple hosts operate during respective scratchpad sessions, the controller 706 may receive information from each host (e.g., in message 720 or indication 744) indicating which logical region (and size) of the NVM 702 the respective host intends to use as scratchpad region 746 or scratchpad memory 716 and thus requests the controller to allocate for that respective host. Similarly, the controller may apply different L2P granularities in updates 734 for different application programs or scratchpad regions associated with the scratchpad region 746 or scratchpad memory 716 allocated for each respective host.

Thus, the system 700 may have a beneficial impact on clients 708 or hosts 710 supporting scratchpad sessions, including IoT devices. For instance, IoT systems are very cost sensitive and may not have sufficient RAM hardware (e.g., host cache 738) for running certain applications such as different games. However, the common scratchpad memory of the data storage device 704 allows these hosts 710 to obtain additional cache memory (e.g., scratchpad regions 746 or scratchpad memory 716) to enable the running of these applications, as well as efficiently store and access different structures of data based on respective application requirements. For example, two IoT hosts connected to the data storage device 704 may each request the storage device to allocate different logical regions of the scratchpad memory (e.g., scratchpad regions 746) for these hosts, and the controller 706 may modify its L2P granularity logic for each of these logical regions (e.g., in updates 734) based on independent determinations or host provided messaging.

Referring now to FIG. 7C, in addition to having NVM submission queues 711 which store commands 722 including data 724 associated with memory locations 714 (e.g., data 726), the system 700 may include scratchpad submission queues 712 for storing commands 722 including data 724 associated with scratchpad memory 716 (e.g., data 732). Generally, multiple hosts 710 of client 708 such as a CPU, a GPU, and an accelerator, as well as multiple such clients each including such hosts, may be connected to the same data storage device 704 with each host being associated with its own submission queue 711 for storage device commands in NVM. In addition to these NVM submission queues 711, the controller 706 may also maintain separate scratchpad submission queues 712 for each of these hosts 710 or clients 708 which may be on par with the other submission queues, but the controller routes only scratchpad requests (commands 722 associated with scratchpad memory 716) to these scratchpad submission queues 712. Thus, during the scratchpad session, the controller 706 may access the scratchpad memory 716 in parallel with the memory locations 714 in response to processing commands respectively associated with these memory locations via their respective submission queues. The scratchpad submission queues 712 may be implemented in firmware or software but can alternatively or additionally be implemented in hardware.

In contrast to the commands 722 in the NVM submission queues 711, which commands typically include FMU-aligned requests directed to logical regions of memory outside the scratchpad area (e.g., memory locations 714), the commands 722 in the scratchpad submission queues 712 may include sector-wise requests or other commands with unaligned data to the FMU size, which commands are directed to the logical regions (or sub-regions) of memory allocated to a respective host or client for scratchpad use (e.g., scratchpad memory 716 or scratchpad region 746). For instance, one scratchpad submission queue 712 may be associated with a CPU and include 1 sector, 9 sector, or other FMU-unaligned commands from that CPU for one region 746 of the scratchpad memory allocated to that CPU, while another scratchpad submission queue 712 may be associated with a GPU and include similar FMU-unaligned commands from that GPU to a different region 746 of the scratchpad memory allocated to that GPU. Alternatively, the commands 722 in the scratchpad submission queues 712 may include FMU-aligned requests similar to the NVM submission queues 711. In another example, one scratchpad submission queue may be associated with a L2P granularity (e.g., a data length in update 734), an application program (e.g., a game or level), a scratchpad sub-region (e.g., scratchpad region 746), or a combination of any of the foregoing, while another scratchpad submission queue may be associated with a different L2P granularity (e.g., another data length in another update), a different application program (e.g., a different game or level), a different scratchpad sub-region (e.g., another scratchpad region), or a combination of any of the foregoing.

In response to receiving requests (commands 722) from the NVM submission queues 711, the controller 706 may create FMU-aligned L2P entries (e.g., updates 728) and perform FMU-aligned data accesses from NVM (e.g., retrievals of data 726) according to conventional practice. In contrast, in response to receiving requests from the scratchpad submission queues 712, the controller 706 may create different L2P entries (e.g., sector-wise or FMU-unaligned, or in some cases FMU-aligned, entries in updates 734) and perform associated data accesses from scratchpad memory (e.g., of data 732) based on the scratchpad logic associated with the respective scratchpad logical region (e.g., scratchpad region 746) or host 710. For example, in response to receiving a command 722 from the scratchpad submission queue 712 for a CPU in a scratchpad region 746 associated with 1 sector L2P granularity, the controller may create 1 sector L2P entries in an update 734 and perform sector-wise data accesses of data 732 from the scratchpad region 746 for that host 710 accordingly. Similarly, in response to receiving a command 722 from another scratchpad submission queue 712 for a GPU in a different scratchpad region 746 associated with 3 sector L2P granularity, the controller may create 3 sector L2P entries in an update 734 and perform similar sector-wise data accesses of data 732 from the scratchpad region 746 for that host 710 accordingly.

The scratchpad submission queues 712 may have respective weightages 748 (or priorities). These weightages 748 may be higher than weightages 750 of the NVM submission queues 711. Thus, as a result of storing scratchpad commands (commands 722 associated with scratchpad memory) in the scratchpad submission queues 712 rather than mixing these commands together with NVM commands (commands 722 associated with memory locations 714) in the NVM submission queues 711, the controller 706 may process the scratchpad requests before the NVM requests, and thus increase the priority of these scratchpad requests with reduced latency compared to NVM requests. Additionally, the weightages 748 may be different for different scratchpad submission queues 712. For instance, the controller 706 may assign a scratchpad submission queue for a CPU with a higher weightage than a scratchpad submission queue for a GPU, since the controller may expect a faster rate of I/O accesses from the CPU than from the GPU. As a result, the controller 706 may process a larger quantity of commands at a time from the scratchpad submission queue 712 for the CPU than from the scratchpad submission queue 712 for the GPU. Thus, clients 708 or hosts 710 with faster rates of I/O accesses, for example, 100 commands per second, may have their commands 722 processed quicker than clients or hosts with slower rates of I/O accesses, for example 50 commands per second.

Typically, the host 710 may provide static weightages for the different scratchpad submission queues 712. For instance, the scratchpad submission queue 712 for a CPU may be fixed with a higher weightage than the scratchpad submission queue 712 for a GPU. Alternatively, the controller 706 may dynamically change the weightages 748 of different scratchpad submission queues based on a quantity of accumulated entries (e.g., commands 722) in respective queues. For instance, the dynamic weightage of a scratchpad submission queue may increase as more commands become pending in that queue and may decrease as commands are executed from that queue. This dynamic changing in weightages may provide a balance in priority handling between scratchpad requests of different clients 708 or hosts 710.

Different application programs (e.g., games) may have different requirements which may even change for different sub-programs of the same application program (e.g., different levels of the same game). As a result, a host 710 may dynamically change the weightage 748 of a respective scratchpad submission queue 712 depending on a current application program (or sub-program) being processed. For example, if the host is running one level, the host may provide a hint (e.g., indication 744) to the storage device not only to associate one L2P granularity in updates 734 for data 732 from that level, but also to assign one predetermined weight to the scratchpad submission queue 712 for that host 710. Then, if the host is running a different level which may have a higher I/O requirement than the other level (and thus result in a faster rate of I/O accesses), the host may hint (e.g., in indication 744) the storage device 704 to associate not only a larger L2P granularity in updates 734 for data 732 from that other level, but also to assign a higher weight to the scratchpad submission queue 712 for that host 710.

Alternatively, the controller 706 may dynamically change the weightage 748 of a respective scratchpad submission queue 712 for a host depending on the current application program (or sub-program) being processed. For example, the controller 706 may set a periodic timer upon which expiration the controller may determine the rate of I/O accesses currently associated with a particular scratchpad submission queue 712 (e.g., from host data patterns 747), and the controller 706 may increase or decrease the weight 748 of that queue in periodic intervals as the rate of I/O accesses increases or decreases respectively over time. As an example, the controller 706 may change the weight 748 of the queue 712 in response to identifying a different rate of I/O accesses from the host 710 running a current level compared to the rate observed when the host was running a previous level. The controller 706 may also increase or decrease the size of an associated L2P granularity in updates 734 associated with a scratchpad region 746 for the host 710 in response to observing a change in the rate of I/O accesses from that host, for example, due to running different games or levels, or in response to a message (e.g., indication 744) from the host indicating the change in L2P granularity accordingly.

Referring back to FIG. 7A, initially before a scratchpad session is active, the controller 706 may receive from a host 710 an indication (e.g., in message 720) of a namespace or NVM set of logical addresses or logical partitions to associate with that host for default operation (e.g., in NVM 702). The controller may receive similar indications (e.g., in message 720) from other hosts 710, such that multiple logical partitions of the storage device may be assigned to different hosts. The controller may allocate logical partitions of the data storage device 704 to each host 710 accordingly. Subsequently, after a scratchpad session is active, the controller 706 may receive an indication from a host 710 (e.g., in message 720) of a scratchpad range in its NVM set or namespace (e.g., in NVM 702) to associate with that host as scratchpad memory 716. The controller 706 may receive multiple such indications (e.g., messages 720) from different hosts for respective NVM sets or namespaces (e.g., different scratchpad memories 716). For example, the controller may initially receive a command from one host in message 720 to initially allocate a logical range encompassing a portion (e.g., scratchpad memory 716) of its logical partition or namespace (e.g., NVM 702) for that host, for example, 16 GB of a 256 GB data storage device. The remainder of the logical partition or namespace (e.g., memory locations 714) may continue to be used during or outside scratchpad sessions for default operation. The controller may receive similar such commands from other hosts in respective messages 720 to allocate scratchpad memories 716 for these other hosts in their respective logical partitions or namespaces (e.g., NVM 702). Alternatively, rather than a scratchpad memory 716 being within a namespace of a host, the scratchpad memory 716 may itself be a different namespace associated with that host. For example, a host may include one namespace or logical partition for NVM (e.g., memory locations 714), and another namespace or logical partition for scratchpad memory 716.

The controller 706 may also receive a message from a host (e.g., message 720) indicating one or more logical sub-ranges of its allocated scratchpad memory 716 for the controller to associate as scratchpad region(s) 746 for the host 710. The controller may receive similar messages 720 from other hosts 710 respectively indicating one or more logical sub-ranges of respectively allocated scratchpad memories 716 for the controller 706 to associate as respective scratchpad region(s) 746 for these other hosts. The controller may associate each of these scratchpad region(s) 746 with one or more properties such as a different application program (e.g., game or level), L2P granularity, scratchpad submission queue, or even a different host. For instance, one scratchpad region 746 may be associated with one application program, L2P granularity in updates 734, scratchpad submission queue 712, host 710, or a combination of the foregoing, while another region 746 may be associated with a different application program, L2P granularity in updates 734, scratchpad submission queue 712, host 710, or combination of the foregoing.

Each respective scratchpad memory 716 or region(s) 746 may include a default L2P granularity in updates 734, a default weightage for an associated scratchpad submission queue 712 with that scratchpad memory 716, region(s) 746, or host 710, and a default workflow for processing scratchpad requests in that scratchpad memory or region(s). For example, a scratchpad memory of a host may include by default a different L2P granularity in updates 734 than that of the NVM region (e.g., memory locations 714) of the host, or a scratchpad region 746 of a host may include by a default a different L2P granularity in updates 734 than that of another scratchpad region 746 of that host. Similarly, a scratchpad submission queue 712 of a host may include by default a weightage 748 higher than a weightage 750 of an NVM submission queue 711 for that host.

The host 710 or controller 706 may change any of these default properties in response to a host indication (e.g., indication 744), a determined I/O access pattern (e.g., stored in host data patterns 747), a number of pending scratchpad requests (e.g., commands 722 in a scratchpad submission queue 712), or some other factor. For example, each host may indicate a L2P granularity for updates 734 that the controller 706 is to maintain for a respective scratchpad memory 716 or scratchpad region(s) 746. Similarly, each host may indicate weightage(s) 748 to be applied to an associated scratchpad submission queue(s) 712 for a respective scratchpad memory 716 or region(s) 746. Alternatively, the controller may independently determine the L2P granularity for updates 734 associated with a respective scratchpad memory 716 or scratchpad region(s) 746, or the weightage(s) 748 for an associated scratchpad submission queue(s) 712, of a host 710. Subsequently, each host 710 may provide to the controller scratchpad requests (e.g., commands 722) for its respective scratchpad memory or region(s), which the host may associate with different application programs (e.g., games or levels).

Figure 8:
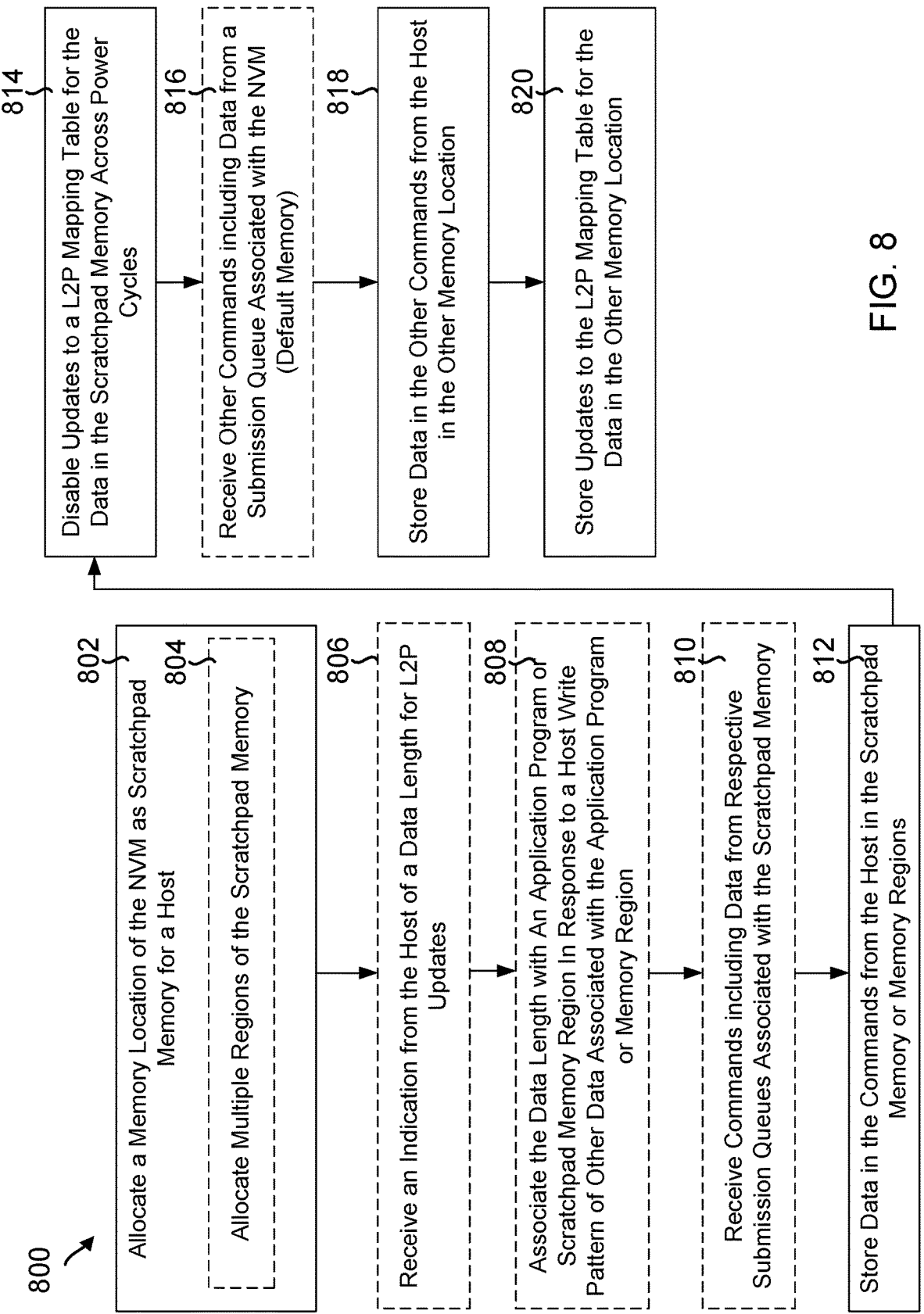
FIG. 8 is a flow chart illustrating an example of a method for optimally storing data in a data storage device supporting a scratchpad session, as performed by the data storage device of FIG. 1.

FIG. 8 illustrates an example flow chart 800 of a method for optimally storing data in a data storage device supporting a scratchpad session. For example, the method can be carried out in a data storage device 102, 704 such as the one illustrated in FIGS. 1 and 7A. Optional aspects are illustrated in dashed lines. Each of the steps in the flow chart can be controlled using the controller as described below (e.g., controller 123, 706), by a component or module of the controller, or by some other suitable means.

As represented by block 802, the controller may allocate a memory location of the NVM as scratchpad memory for a host. Moreover, as represented by block 804, the controller may allocate multiple regions of the scratchpad memory. For example, referring to the aforementioned Figures, the controller 123, 706 may allocate one or more of the memory locations 112 of the NVM 110, 702 (e.g., a first memory location) as scratchpad memory 716 respectively for one or more hosts 104, 710 during a scratchpad session. The controller 123, 706 may also allocate multiple scratchpad regions 746 of this memory location or scratchpad memory 716 for one or more host(s) 104, 710 during the scratchpad session. For instance, one region of scratchpad memory (e.g., a first region) may be associated with one host, while another region of scratchpad memory (e.g., a second region) may be associated with a different host, although in other examples multiple scratchpad regions may be associated with the same host. In contrast, one or more other memory locations 112, 714 of the NVM (e.g., a second memory location) may remain as default NVM during the scratchpad session.

As represented by block 806, the controller may receive an indication from the host of a data length for L2P updates. For example, referring to the aforementioned Figures, the controller 123, 706 may receive indication 744 from host 710 of a data length (e.g., length 312) for each of the updates 734 (e.g., entries 306 in L2P mapping updates 122, 302). This data length (e.g., a first data length) may be different than a data length for L2P updates not associated with scratchpad memory 716 (e.g., a second data length or length 212, 312 for each of the updates 728). For instance, each update 728 may include a 4 KB data length as illustrated in FIGS. 2 and 3, while each update 734 may include a data length of at least one sector (e.g., 512 bytes) of the NVM 702. Thus, updates 728 for data 726 may have different L2P granularity than updates 734 for data 732. In this example, the determined L2P granularity for updates 734 is host-assisted (e.g., hinted via indication 744), but in other examples, the L2P granularity may be determined by the controller 706 (e.g., from host data patterns 747).

As represented by block 808, the controller may associate the data length with an application program or scratchpad memory region in response to a host write pattern of other data associated with the application program or memory region. For example, referring to the aforementioned Figures, the controller 123, 706 may associate the data lengths of one or more updates 734 with an application program (e.g., a game or level) or scratchpad region 746 in response to identifying prior correspondence of that data length with the same application program or scratchpad region 746 from host write patterns 747. For instance, initially, the controller may by default apply a 4 KB data length for each update 734 associated with a particular game or scratchpad region during the scratchpad session. However, if the controller later determines from host write patterns 747 stored in volatile memory 118, 730 that the data 732 in each command 722 for a particular game or stored in a particular scratchpad region typically spans 3 sectors in length, the controller may similarly configure each update 734 for data 732 of that same game or scratchpad region to have a three sector data length (e.g., the length 312 of each subsequent entry in the L2P mapping updates 122, 302 is changed from 4 KB to 3 sectors).

As represented by block 810, the controller may receive commands including data from respective submission queues associated with the scratchpad memory. For instance, referring to the aforementioned Figures, the controller 706 may receive commands 722 including data 724 from one or more scratchpad submission queues 712 associated with scratchpad memory 716 during the scratchpad session.

As represented by block 812, the controller may store data in the commands from the host in the scratchpad memory or memory regions. For instance, referring to the aforementioned Figures, the controller 706 may program data 724, 732 (e.g., first data from the host 710) in the scratchpad memory 716 or one of the scratchpad regions 746 during the scratchpad session in response to the command 722 for that data 724, 732 indicating a logical address associated with the scratchpad memory 716 or scratchpad region 746. This data 724, 732 may be data segregated from other host data (e.g., data 742) in segregation module 736 of host 710, where the other host data has a data length less than one sector (e.g., a quantity of bytes). Moreover, the data 724, 732 may have a lower QoS than the data 742.

The controller may configure different L2P granularities for scratchpad data associated with different application programs or scratchpad regions. For instance, referring to the aforementioned Figures, in addition to programming data 724, 732 of one command (e.g., first data from the host) in the scratchpad memory 716 or one of the scratchpad regions 746 (e.g., a first region of scratchpad memory) during the scratchpad session, as well as programming data 724, 726 of another command (e.g., second data from the host) in the memory locations 714 outside the scratchpad memory, the controller 706 may program data 724, 732 of a further command (e.g., third data from the host) in the scratchpad memory 716 or one of the scratchpad regions 746 (e.g., a second region of the scratchpad memory). In such case where the different data 724, 732 (e.g., the first data and third data) are associated with different application programs such as different games or levels, or with different scratchpad regions, the controller 706 may configure different data lengths 312 for respective updates 734 associated with the data (e.g., a first update and third update, respectively). For example, each entry 306 in the L2P mapping updates 122, 302 for data 724, 732 associated with one game (e.g., the first update) or region (e.g., the first region) may have a data length of 1 sector, while each entry 306 in the L2P mapping updates 122, 302 for data 724, 732 associated with a different game (e.g., the third update) or region (e.g., the second region) may have a data length of 9 sectors.

The different L2P granularities (e.g., the first data length and the third data length) for respective updates 734 may be host-assisted, similar to as described at block 806. For example, the controller 706 may receive an indication (e.g., indication 744) from the host 710 of the data lengths 312 for the respective updates 734 (e.g., the first update and the third update). Alternatively or additionally, the different L2P granularities may be determined at the controller based on host write patterns, similar to as described at block 808. For example, the controller 123, 706 may associate the data lengths of respective updates 734 (e.g., the first update and the third update) with different application programs (e.g., games or levels) or scratchpad regions 746 in response to identifying prior correspondence of the respective data length with the same application program or scratchpad region 746 from host write patterns 747. For instance, initially, the controller may by default apply a 4 KB data length for each update 734 associated with each game or scratchpad region during the scratchpad session. However, if the controller later determines from host write patterns 747 stored in volatile memory 118, 730 that the data 732 in each command 722 for one game or stored in a one scratchpad region typically spans 1 sector in length, while the data 732 in each command 722 for another game or stored in another scratchpad region typically spans 9 sectors in length, the controller may configure each update 734 for data 732 of the respective games or scratchpad regions to have a one sector data length or a nine sector data length respectively.

As represented by block 814, the controller may disable updates to a L2P mapping table for the data in the scratchpad memory across power cycles. For instance, referring to the aforementioned Figures, during the scratchpad session, while the controller may continue to store and refer to updates 734 in volatile memory 118, 730 (e.g., the aforementioned, first updates and third updates for data 732 stored in scratchpad memory 716), the controller may refrain from flushing or merging these updates 734 into the L2P mapping table 120, 205, 718. Therefore, if the data storage device is reset or a power cycle occurs in some other manner, the L2P mapping table will not include these updates 734 and therefore the scratchpad data 732 associated with these updates may be lost or invalidated.

As represented by block 816, the controller may receive other commands including data from a submission queue associated with the NVM (default memory). For instance, referring to the aforementioned Figures, the controller 706 may receive commands 722 including data 724 (e.g., data 726) from one or more of the NVM submission queues 711 during or outside the scratchpad session. For example, after the controller 706 receives one command including data 724 (e.g., a first command including first data) from a scratchpad submission queue 712 (e.g., a first submission queue associated with scratchpad memory 716) during a scratchpad session and the scratchpad session ends, the controller 706 may receive another command (e.g., a second command including second data) from a NVM submission queue 711 (e.g., a second submission queue associated with the NVM 702) during or outside the scratchpad session.

Moreover, the controller may associate different scratchpad submission queues with different hosts, weightages, scratchpad regions, L2P granularity, or a combination of the foregoing. For instance, referring to the aforementioned Figures, the controller 706 may further receive another command including data 724 (e.g., a third command including third data) from another one of the scratchpad submission queues 712 (e.g., a third submission queue associated with scratchpad memory 716) during the scratchpad session. In such case, one of the scratchpad submission queues may be associated with one host (e.g., the first queue may be associated with a CPU), while another one of the scratchpad submission queues may be associated with a different host (e.g., the third queue may be associated with a GPU). Alternatively or additionally, the different scratchpad submission queues 712 (e.g., the first submission queue and the third submission queue) may have different weightages 748 or priorities, and the different scratchpad submission queues 712 may have greater weightages 748 than the NVM submission queue 711 (e.g., the second submission queue). Alternatively or additionally, the different scratchpad submission queues 712 (e.g., the first submission queue and the third submission queue) may be associated with different scratchpad regions 746 (e.g., a first region and a second region of the scratchpad memory 716, respectively). Alternatively or additionally, the different scratchpad submission queues 712 (e.g., the first submission queue and the third submission queue) may be associated with different data lengths 312 of updates 734 to the L2P mapping table 120, 205, 718 (e.g., a first data length in the entry of one L2P update and a second data length in the entry of another L2P update, respectively). Moreover, as previously described, these data lengths or L2P granularities (e.g., the first data length and the second data length) may be associated with different scratchpad regions 746 of the scratchpad memory 716 (e.g., a first region of the scratchpad memory and a second region of the scratchpad memory, respectively). Furthermore, these regions (e.g., the first region and the second region) may be associated with different hosts 710 as previously described.

As represented by block 818, the controller may store data in the other commands from the host in the other memory location. For instance, referring to the aforementioned Figures, the controller 706 may program data 724, 726 (e.g., second data from host 710) in the memory locations 714 associated with the logical address(es) indicated in the command 722 for data 724 during or outside of the scratchpad session.

Finally, as represented by block 820, the controller may store updates to the L2P mapping table for the data in the other memory location. For instance, referring to the aforementioned Figures, after the controller 706 stores updates 728 in volatile memory 118, 730 (e.g., second updates for data 724, 726 stored in memory location(s) 714), the controller may subsequently flush or merge these updates 728 into the L2P mapping table 120, 205, 718 in the NVM 702. Therefore, if the data storage device is reset or a power cycle occurs in some other manner, the L2P mapping table will include these updates 728, and therefore the non-volatile data 726 associated with these updates may be maintained.

FIG. 9 is a conceptual diagram illustrating an example 900 of a controller 902 coupled to a memory 904 in a data storage device. For example, controller 902 may correspond to controller 123, 706 and memory 904 may correspond to the NVM 110, 702 of the storage device 102, 704 in FIGS. 1 and 7A. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

In one example, the controller 902 includes an allocation module 906 that may provide a means for allocating the first memory location of the NVM as scratchpad memory for a host. For example, the allocation module 906 may perform the process described above with respect to blocks 802 and 804 of FIG. 8. In one example of this process, in response to a message 720 from the host 104, 710 to start the scratchpad session, the allocation module 906 may determine one or more memory locations 112 to be used for scratchpad memory 716. In one example, the message 720 from the host 104 may include a range of logical addresses to be used for scratchpad memory 716 or a scratchpad region 746. In response to receiving the message 720, the allocation module 906 may access the L2P mapping table 120, 205 or L2P mapping updates 122, 302 and identify the physical addresses of the block(s) for which there are no entries 206, 306 in the L2P mapping table or updates (indicating the blocks or memory locations 112 that are currently unused). The allocation module 906 may create one or more entries 306 in L2P mapping updates 122, 302 associating the identified physical address(es) with the received logical addresses (for the scratchpad memory 716 or scratchpad region 746) in the message 720.

In another example, the controller 902 includes a command module 908 that may provide a means for receiving a first command including first data from a first submission queue associated with the scratchpad memory and a second command including second data from a second submission queue associated with the NVM. For example, the command module 908 may perform the process described above with respect to blocks 810 and 816 of FIG. 8. In one example of this process, during a scratchpad session, the command module 908 may compare the weightage 748 of a scratchpad submission queue 712 for the scratchpad memory 716 and host 710 with the weightages 748 of other scratchpad submission queues 712, and obtain one or more commands 722 from the scratchpad submission queue 712 having a quantity based on the weightage (e.g., more commands for higher weightage or less commands for lower weightage). Afterwards, the command module 908 may compare the weightage 750 of a NVM submission queue 711 for the host 710 with the weightages 748 of other NVM submission queues 711, and obtain one or more commands 722 from the NVM submission queue 711 having a quantity based on the weightage (e.g., more commands for higher weightage or less commands for lower weightage).

In another example, the controller 902 includes a storage module 910 that may provide a means for storing the first data in the scratchpad memory, the second data in the second memory location, and an update to a L2P mapping table for the second data in the second memory location. For example, the storage module 910 may perform the process described above with respect to blocks 812, 818, and 820 of FIG. 8. In one example of this process, during a scratchpad session, the storage module 910 may identify from the L2P mapping table 120, 205 or L2P mapping updates 122, 302 a physical address associated with the logical address indicated in the command 722 obtained from the scratchpad submission queue 712, and program the data 724, 732 indicated in the command 722 in cells 116, 402 of the scratchpad memory 716 or scratchpad region 746 associated with the host 710. Afterwards, the storage module 910 may identify from the L2P mapping table 120, 205 or L2P mapping updates 122, 302 a physical address associated with the logical address indicated in another command 722 obtained from the NVM submission queue 711, and program the data 724, 726 indicated in the command 722 in cells 116, 402 of the memory locations 714 associated with the host 710 which are not allocated as scratchpad memory. Additionally, the storage module 910 may create an entry 306 for L2P mapping updates 122, 302 including the logical address 308 indicated in the command 722, the physical address 310 of the memory location 714 in which the data 724, 726 of command 722 is stored, and the data length 312 or L2P granularity of the data 724, 726 stored in that memory location, and the storage module 910 may write (e.g., flush or merge) the entry 306 with other L2P mapping updates as entries 206 to the L2P mapping table 120, 205, 718.

In another example, the controller 902 includes an update module 912 that may provide a means for disabling another update to the L2P mapping table for the first data in the scratchpad memory across power cycles. For example, the update module 912 may perform the process described above with respect to block 814 of FIG. 8. In one example of this process, the update module 912 may create an entry 306 for L2P mapping updates 122, 302 including the logical address 308 indicated in the command 722, the physical address 310 of the scratchpad memory 716 in which the data 724, 732 of command 722 is stored, and the data length 312 or L2P granularity of the data 724, 732 stored in that memory location, and the update module 912 may refrain from writing (e.g., flush or merge) the entry 306 to the L2P mapping table 120, 205, 718. For instance, in response to a request from the host 104 to end the scratchpad session or power down the data storage device 102, 704, the update module 912 may leave entries 306 in volatile memory 118, 730 that were allocated for scratchpad memory without merging them into the L2P mapping table 120, 205, 718 in NVM 110, 702. For example, the update module 912 may receive the logical address of the one or more memory locations 112 allocated for scratchpad memory 716 from the allocation module 906, access the L2P mapping updates 122, 302 in the volatile memory 118, 730, identify the entries 306 whose logical addresses 308 match the received logical address (indicating those entries correspond to scratchpad memory 716), and then leave those identified entries 306 in the volatile memory 118, 730 while flushing the other entries 306 (not associated with scratchpad memory) into NVM 110, 702 to be merged with L2P mapping table 120, 205, 718.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other data storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A data storage device, comprising:
non-volatile memory (NVM) including a first memory location and a second memory location; and
one or more processors coupled to the NVM, the one or more processors, individually or in combination, configured to:
allocate the first memory location of the NVM as scratchpad memory for a host;
store first data from the host in the scratchpad memory;
disable a first update to a logical-to-physical (L2P) mapping table for the first data in the scratchpad memory;
store second data from the host in the second memory location; and
store a second update to the L2P mapping table for the second data in the second memory location;
wherein the first update includes a first amount of data in a first L2P entry for the stored first data and the second update includes a second amount of data in a second L2P entry for the stored second data different than the first amount of data, the first amount of data being a first L2P granularity of the stored first data, and the second amount of data being a second L2P granularity of the stored second data, the first L2P granularity and the second L2P granularity being associated with different ranges of logical addresses, and the first L2P granularity being unique for scratchpad data.

2. The data storage device of claim 1,
wherein a data length of the first data is at least one sector of the NVM.

3. The data storage device of claim 2,
wherein the first data is data segregated from other host data;
wherein a data length of the other host data is less than one sector of the NVM;
wherein the first data is associated with a lower quality of service (QoS) than the other host data.

4. The data storage device of claim 1,
wherein the one or more processors, individually or in combination, are further configured to receive an indication from the host of the first L2P granularity for the first update.

5. The data storage device of claim 1,
wherein the one or more processors, individually or in combination, are further configured to:
store third data from the host in the scratchpad memory; and
disable a third update to the L2P mapping table for the third data in the scratchpad memory; and
wherein the third data is associated with a different application program than the first data;
wherein the third update includes a third L2P granularity of the stored third data that is different than the first L2P granularity of the first update.

6. The data storage device of claim 5,
wherein the one or more processors, individually or in combination, are further configured to receive an indication from the host of the first L2P granularity for the first update and the third L2P granularity for the third update.

7. The data storage device of claim 5,
wherein the one or more processors, individually or in combination, are further configured to associate the third L2P granularity of the third update with an application program associated with the third data in response to a host write pattern of other data associated with the application program.

8. The data storage device of claim 1,
wherein the one or more processors, individually or in combination, are further configured to:
  allocate a first region and a second region of the scratchpad memory;
  store the first data in the first region of the scratchpad memory;
  store third data in the second region of the scratchpad memory; and
  disable a third update to the L2P mapping table for the third data in the scratchpad memory;
wherein the third update includes a third L2P granularity of the stored third data that is different than the first L2P granularity of the first update.

9. The data storage device of claim 8,
wherein the first region and the second region are associated with different hosts.

10. The data storage device of claim 8,
wherein the third data is associated with an application program;
wherein the one or more processors, individually or in combination, are further configured to associate the third L2P granularity of the third update with the second region of the scratchpad memory in response to a host write pattern of other data associated with the application program.

11. The data storage device of claim 1,
wherein the one or more processors, individually or in combination, are further configured to:
  receive a first command including the first data from a first submission queue associated with the scratchpad memory, the first submission queue including requests for volatile data; and
  receive a second command including the second data from a second submission queue associated with the NVM, the second submission queue including requests for non-volatile data.

12. A data storage device, comprising:
non-volatile memory (NVM) including a first memory location and a second memory location; and
one or more processors coupled to the NVM, the one or more processors, individually or in combination, configured to:
  allocate the first memory location of the NVM as scratchpad memory for a host;
  receive a first command including first data from a first submission queue associated with the scratchpad memory, the first submission queue including requests for volatile data;
  store the first data in the scratchpad memory;
  disable a first update to a logical-to-physical (L2P) mapping table for the first data in the scratchpad memory;
  receive a second command including second data from a second submission queue associated with the NVM, the second submission queue including requests for non-volatile data;
  store the second data in the second memory location; and
  store a second update to the L2P mapping table for the second data in the second memory location;
wherein the first update includes a first amount of data in a first L2P entry for the stored first data and the second update includes a second amount of data in a second L2P entry for the stored second data different than the first amount of data, the first amount of data being a first L2P granularity of the stored first data, and the second amount of data being a second L2P granularity of the stored second data, the first L2P granularity and the second L2P granularity being associated with different ranges of logical addresses, and the first L2P granularity being unique for scratchpad data.

13. The data storage device of claim 12,
wherein the one or more processors, individually or in combination, are further configured to receive a third command including third data from a third submission queue associated with the scratchpad memory, the third submission queue including other requests for volatile data;
wherein the first submission queue and the third submission queue are associated with different hosts.

14. The data storage device of claim 12,
wherein the one or more processors, individually or in combination, are further configured to receive a third command including third data from a third submission queue associated with the scratchpad memory, the third submission queue including other requests for volatile data;
wherein the first submission queue is associated with a different weightage than the third submission queue.

15. The data storage device of claim 12,
wherein the first submission queue is associated with a greater weightage than a weightage of the second submission queue.

16. The data storage device of claim 12,
wherein the one or more processors, individually or in combination, are further configured to:
  allocate a first region and a second region of the scratchpad memory; and
  receive a third command including third data from a third submission queue associated with the scratchpad memory, the third submission queue including other requests for volatile data;
wherein the first submission queue is associated with the first region and the third submission queue is associated with the second region.

17. The data storage device of claim 12,
wherein the one or more processors, individually or in combination, are further configured to:
  receive a third command including third data from a third submission queue associated with the scratchpad memory, the third submission queue including other requests for volatile data; and
  disable a third update to the L2P mapping table for the third data in the scratchpad memory; and
wherein the third update includes a third L2P granularity of the third data different than the first L2P granularity;
wherein the first submission queue is associated with the first L2P granularity and the third submission queue is associated with the third L2P granularity.

18. The data storage device of claim 17,
wherein the one or more processors, individually or in combination, are further configured to allocate a first region and a second region of the scratchpad memory;

wherein the first L2P granularity is associated with the first region and the third L2P granularity is associated with the second region.

19. The data storage device of claim 18,
wherein the first region is associated with a different host than that of the second region.

20. A data storage device, comprising:
non-volatile memory (NVM) including a first memory location and a second memory location;
means for allocating the first memory location of the NVM as scratchpad memory for a host;
means for receiving a first command including first data from a first submission queue associated with the scratchpad memory and a second command including second data from a second submission queue associated with the NVM, the first submission queue including requests for volatile data and the second submission queue including requests for non-volatile data;
means for storing the first data in the scratchpad memory, the second data in the second memory location, and an update to a logical-to-physical (L2P) mapping table for the second data in the second memory location; and
means for disabling another update to the L2P mapping table for the first data in the scratchpad memory;
wherein the another update includes a first amount of data in a first L2P entry for the stored first data and the update includes a second amount of data in a second L2P entry for the stored second data different than the first amount of data, the first amount of data being a first L2P granularity of the stored first data, and the second amount of data being a second L2P granularity of the stored second data, the first L2P granularity and the second L2P granularity being associated with different ranges of logical addresses, and the first L2P granularity being unique for scratchpad data.

\* \* \* \* \*